United States Patent [19]

Munakata

[11] Patent Number: 5,988,854
[45] Date of Patent: Nov. 23, 1999

[54] DATA UNIFYING PROCEDURE DETERMINING SYSTEM AND APPLICABLE ARTICLE MANUFACTURING PROCEDURE DETERMINING SYSTEM

[75] Inventor: Koichi Munakata, Tokyo, Japan

[73] Assignee: Mitsubishi Denki Kabushiki Kaisha, Tokyo, Japan

[21] Appl. No.: 08/980,377

[22] Filed: Nov. 28, 1997

[30] Foreign Application Priority Data

Dec. 4, 1996 [JP] Japan ................................ 8-324034

[51] Int. Cl.[6] .............................. G06F 19/00; G06G 7/66
[52] U.S. Cl. .............................. 364/468.01; 364/468.03; 364/468.05
[58] Field of Search .................... 364/468.02, 468.01, 364/468.03–468.05, 149, 150, 151, 148.03, 478.05, 578; 395/602, 612, 600

[56] References Cited

U.S. PATENT DOCUMENTS

| 5,485,548 | 1/1996 | Oteki et al. ................................ 395/27 |
| 5,493,504 | 2/1996 | Minato ................................ 364/488 |
| 5,495,417 | 2/1996 | Fuduka et al. ................................ 364/468 |
| 5,586,020 | 12/1996 | Isozaki ................................ 395/707 |
| 5,594,898 | 1/1997 | Dalal et al. ................................ 395/602 |
| 5,787,010 | 7/1998 | Schaefer et al. ................................ 364/489 |
| 5,796,614 | 8/1998 | Yamada ................................ 364/468.13 |

OTHER PUBLICATIONS

VLDB Conference Mumbai (Bombay), India, 1996, Querying Heterogenous Information Sources Using Source Descriptions, Alon Y. Levy, Anand Rajarman, Joann J. Ordille, 12 pgs.

VLDB conference Mumbai (Bombay), India, 1996, Querying Heterogeneous Information Sources Using Source Descriptions, Levy et al., Dec. 1996.

*Primary Examiner*—William Grant
*Assistant Examiner*—Ramesh Patel
*Attorney, Agent, or Firm*—Sughrue, Mion, Zinn, Macpeak & Seas, PLLC

[57] ABSTRACT

When an element process has been given, an initial graph is produced, a dependency graph is deformed from the initial graph, and then the dependency graph is deconstructed so that a process expression tree is produced.

14 Claims, 26 Drawing Sheets

| VARIABLE | $A | $B | $C | $D | $E | $F | $G | $H | $I | $J |
|---|---|---|---|---|---|---|---|---|---|---|
| PROCESS FOR USE AS OUTPUT VARIABLE | S1 | S2 | S3 | S3 | C1 | S4 | S4 | C2 | C2 | S5 |
| PROCESS FOR USE AS INPUT VARIABLE | C1, J1 | J1, J2 | J2 | C1 | J3 | C2 | | | J3 | J4 | J4 |

FIG. 20

(a) TABLE N

| NAME | STAFF NO. |
|---|---|
| HANAKO SUZUKI | 111 |
| JIRO TANAKA | 222 |
| TARO YAMADA | 333 |

(b) TABLE Y

| STAFF NO. | YEAR OF EMPLOYMENT |
|---|---|
| 111 | 1970 |
| 222 | 1984 |

(c) RESULT OF INNER JOIN

| NAME | STAFF NO. | YEAR OF EMPLOYMENT |
|---|---|---|
| HANAKO SUZUKI | 111 | 1970 |

(d) RESULT OF OVER JOIN (WHEN RELATION N IS RETAINED)

| NAME | STAFF NO. | YEAR OF EMPLOYMENT |
|---|---|---|
| HANAKO SUZUKI | 111 | 1970 |
| JIRO TANAKA | 222 | |
| TARO YAMADA | 333 | |

(e) RESULT OF FULL OUTER JOIN

| NAME | STAFF NO. | YEAR OF EMPLOYMENT |
|---|---|---|
| HANAKO SUZUKI | 111 | 1970 |
| JIRO TANAKA | 222 | |
| TARO YAMADA | 333 | |
| | 444 | 1984 |

| CORRECTION PROFIT ($J) |
|---|
| 0 (1, 0) |
| -97 (0, 0) |

| PART NAME. ($K) | PART NO. ($L) |
|---|---|
| CAMERA | T48 |
| TELEVISION | T52 |

| PART NO. ($L) | MODEL NO. ($M) |
|---|---|
| T48 | NA - 6 |
| T32 | P - 3 |
| T12 | AB16 |

FIG. 25

| PART NO. ($L) | MODEL NO. ($M) |
|---|---|
| T48 | NA - 6 |
| T32 | P - 3 |

FIG. 26

| PART NAME. ($K) | PART NO. ($L) | MODEL NO. ($M) |
|---|---|---|
| CAMERA | T48 | NA - 6 |
| TELEVISION | T52 | |
| | T32 | P - 3 |

FIG. 27

| PART NAME. ($K) | PART NO. ($L) | MODEL NO. ($M) |
|---|---|---|
| CAMERA | T48 | NA - 6 |

FIG. 28

| PART NAME. ($K) | PART NO. ($L) | MODEL NO. ($M) |
|---|---|---|
| CAMERA | T48 | NA - 6 |
| TELEVISION | T52 | |

FIG. 29

| PART NAME. ($K) | PART NO. ($L) | MODEL NO. ($M) |
|---|---|---|
| CAMERA | T48 | NA - 6 |
| | T32 | P - 3 |

FIG. 36

| NAME | NO. | SEX. |
|---|---|---|
| TARO YAMADA | 13 | MAN |
| JIRO SUZUKI | 26 | MAN |
| HANAKO SATO | 32 | WOMAN |

FIG. 37

| NO. | POSITION |
|---|---|
| 13 | CHIEF |
| 32 | MANAGER |

FIG. 38

| NAME | NO. | SEX. | POSITION |
|---|---|---|---|
| TARO YAMADA | 13 | MAN | CHIEF |
| HANAKO SATO | 32 | WOMAN | MANAGER |

FIG. 39

| NAME | NO. | SEX. |
|---|---|---|
| TARO YAMADA | 13 | MAN |
| JIRO SUZUKI | 26 | MAN |

FIG. 40

| NAME | NO. | SEX. | FAMILY NAME | PERSONAL NAME |
|---|---|---|---|---|
| TARO YAMADA | 13 | MAN | YAMADA | TARO |
| JIRO SUZUKI | 26 | MAN | SUZUKI | JIRO |
| HANAKO SATO | 32 | WOMAN | SATO | HANAKO |

| DAY ($A) |
|---|
| JUNE 13, 1994 |
| JULY 4, 1995 |
| JUNE 3, 1996 |

| PLACE ($B) |
|---|
| 1994 (OSAKA) |
| 1995 (TOKYO) |
| 1996 (NAGOYA) |

FIG. 44

| NUMBER OF AUDIENCE ($C) | PLACE ($D) |
|---|---|
| 34000 | OSAKA |
| 58000 | TOKYO |
| 27000 | KYOTO |
| 26000 | NAGOYA |

FIG. 45

| DURATION OF SUNSHINE ($F) | COEFFICIENT OF NUMBER OF AUDIENCE ($G) |
|---|---|
| 8 | 1.0 |
| 3 | 0.7 |
| 0 | 0.3 |

FIG. 46

| CORRECTION OF PROFIT ($J) |
|---|
| 27 (1, 2) |
| 0 (1, 0) |
| -18 (0, 8) |
| -45 (0, 6) |
| -60 (0, 4) |
| -72 (0, 2) |
| -97 (0, 0) |

FIG. 47

| DAY ($A) |
|---|
| JUNE 13, 1994 |
| JUNE 3, 1996 |

FIG. 48

| DAY ($A) | PLACE ($B) |
|---|---|
| JUNE 13, 1994 | 1994 (OSAKA) |
| JUNE 3, 1996 | 1996 (NAGOYA) |

FIG. 49

| DAY ($A) | PLACE ($B) | NUMBER OF AUDIENCE ($C) | PLACE ($D) |
|---|---|---|---|
| JUNE 13, 1994 | 1994 (OSAKA) | 34000 | OSAKA |
| JUNE 3, 1996 | 1996 (AICHI) | 26000 | NAGOYA |

FIG. 50

| DAY ($A) | PLACE ($B) | NUMBER OF AUDIENCE ($C) | PLACE ($D) | WEATHER ($E) |
|---|---|---|---|---|
| JUNE 13, 1994 | 1994 (OSAKA) | 34000 | OSAKA | CLEAR |
| JUNE 3, 1996 | 1996 (AICHI) | 26000 | NAGOYA | RAIN |

FIG. 51

| DURATION OF SUNSHINE ($F) | COEFFICIENT OF NUMBER OF AUDIENCE ($G) |
|---|---|
| 8 | 1.0 |
| 3 | 0.7 |

FIG. 52

| DURATION OF SUNSHINE ($F) | COEFFICIENT OF NUMBER OF AUDIENCE ($G) | WEATHER ($E) | CORRECTION OF SALES ($I) |
|---|---|---|---|
| 8 | 1.0 | CLEAR | 1.2 |
| 3 | 0.7 | CLOUDY | 0.9 |

FIG. 53

| DAY ($A) | PLACE ($B) | NUMBER OF AUDIENCE ($C) | PLACE ($D) | WEATHER ($E) | DURATION OF SUNSHINE ($F) | COEFFICIENT OF NUMBER OF AUDIENCE ($G) | WEATHER ($H) | CORRECTION OF SALES ($I) |
|---|---|---|---|---|---|---|---|---|
| JUNE 3, 1994 | 1994 (OSAKA) | 34000 | OSAKA | CLEAR | 8 | 1.0 | CLEAR | 1.2 |

FIG. 54

| DAY ($A) | PLACE ($B) | NUMBER OF AUDIENCE ($C) | PLACE ($D) | WEATHER ($E) | DURATION OF SUNSHINE ($F) | COEFFICIENT OF NUMBER OF AUDIENCE ($G) | WEATHER ($H) | CORRECTION OF SALES ($I) | CORRECTION OF PROFIT ($I) |
|---|---|---|---|---|---|---|---|---|---|
| JUNE 3, 1994 | 1994 (OSAKA) | 34000 | OSAKA | CLEAR | 8 | 1.0 | CLEAR | 1.2 | 27 (1.2) |

5,988,854

DATA UNIFYING PROCEDURE DETERMINING SYSTEM AND APPLICABLE ARTICLE MANUFACTURING PROCEDURE DETERMINING SYSTEM

BACKGROUND OF THE INVENTION

The present invention relates to a system relates to a system for determining a data unifying procedure for joining, processing and unifying data obtained from various information sources, and to an applicable system for determining a manufacturing procedure of articles.

The manufacturing procedure and data unifying procedures attempted to be determined by the present invention are, in the prior art, composed of four processes below.

Supply Process:

Parts are supplied. The supply process outputs one or more parts formed into one set. FIG. 32 shows supply process S for outputting three parts $A, $B and $C as one set.

Joining process:

Parts in two sets supplied to the joining process as an input are outputted as parts in one set, or parts supplied to the joining process as an input are outputted as parts in one deconstructed set. However, there is also a case where the part which is input to this process forms a set with one or more parts which do not relate to the joining process. In this case, parts are output including the parts which do not relate this process and they are formed into one set. FIG. 33A shows joining process J in which two sets of parts are input such that parts $C and $D formed into one set and parts $E formed into one set are input. Then, the parts in the two sets are joined into one set and then output. FIG. 33B shows joining process J in which parts $C and $E forming one set are input. Then, the parts are deconstructed and output. However, in a process shown in FIG. 33A, for example, a part (for example, $E) which is input to this process J has been formed into a set with another part (for example, $F). In the foregoing case, this process outputs four parts $C, $D, $E and $F forming one set.

Processing Process:

One or more parts which are supplied to this process as an input and which form one set are processed. The parts which are input for processing, must be formed into one set in the pervious joining process before the parts are input for processing. The input parts are processed so that a new part is made. An output is composed of all of the input parts and one or more parts which have been newly made. However, there is also a case where the part which is input to this Process has been formed into a set with one or more parts which do not relate to this process. In this case, parts, including the parts which do not relate to this process, are output and formed into one set. FIG. 34 shows, a joining process Column in which two parts $G and $H forming one set are input, and then processed so that two parts $I and $J are made and parts $G, $H, $I and $J forming one set are output. However, in the process shown in FIG. 34 for example, the parts $G and $H, which are input to this process C, have been formed into a set-with another part (for example, $B). In the foregoing case, this process outputs five parts $B, $G, $H, $I and $J forming one set.

End Process:

The end process is a process to which one or more parts that are integrally formed are input. FIG. 35 shows a state where integrated parts $L and $M are input to the end process V. In general, a new part is made in the step of processing in accordance with the part supplied from the supply process, a plurality of parts are integrated in the joining process, and then the integrated parts are finally input to the end process. Thus, the manufacturing process is ended.

When the above-mentioned manufacturing procedure is applied to a data unifying procedure, the supply process, the joining process, the processing process and the end process are specifically performed as follows.

Supply Process:

Data is acquired from an information source, and then converted into one table of a relational data base. At this time, each column of the table corresponds to the part. The respective columns of the table, which are parts, are formed into a set so that a table is formed and the table is output. FIG. 36 is a diagram showing an example of a table for determining a conventional data unifying procedure. The table includes three columns standing for names, numbers and sexes. The contents of the foregoing table are three rows. Each row indicates one entity. For example, the first row expresses an entity of a "Human Being" indicated such that "Name" is "Taro Yamada", "Number" is "13" and "Sex" is "Man".

Joining process:

Two tables supplied as an input are joined, and outputted as one table, or rows are selected from one table supplied to this process as an input in accordance with instructed conditions, and a table composed of only the selected rows is output. FIG. 37 is a diagram showing an example of a table relating to the table shown in FIG. 36. When the table shown in FIG. 36 and that shown in FIG. 37 are subjected to a comparison, a fact can be understood from FIG. 37 that the "Number" of "Taro Yamada" is "13". A fact can be understood from FIG. 37 that the "Position" of a stuff, the "Number" of which is "13" is "Chief". Thus, the table shown in FIG. 36 arid that shown in FIG. 37 can be joined in terms of the "Number". The thus-produced table is shown in FIG. 38. FIG. 38 shows a table in which the parts "Name", "Number" and "Sex" on three columns shown in FIG. 36 and parts on columns "Number" and "Position" shown in FIG. 37 are joined to-be one set ~e that the table shown in FIG. 38 is formed. In the joining-process, the table formed by joining as shown in FIG. 38 is output. Alternatively, in the joining process, a row is selected from the table shown in FIG. 36 in accordance with a condition that the "Sex" is man and a table composed of only the selected rows and shown in FIG. 39 is output.

Processing Process:

The contents of one or more columns are changed for each row of the table formed by producing one or more columns supplied as an input into one set are converted to make one or more columns. Then, the results of the conversion are made to be the contents of the produced column. For example, each row of the table shown in FIG. 36 is processed such that the contents of the column of the "Name" are divided into family name and personal name so that two columns which are "Family Name" and "Personal Name" are produced. The results of the conversion are employed as the contents of the columns "Family Name" and "Personal Name". As a result, a table shown in FIG. 40 is produced.

End Process:

Tables acquired from the information sources corresponding to the supply process are joined or processed so 'that one final table is obtained which is then input so as to be converted into another data format or displayed or transferred to another application program. End processes shown in FIG. 41 are assumed to be given. Examples of information sources for supplying data which is obtained by supply processes S1, S2, S3, S4 and S5 respectively are shown in FIGS. 42, 43, 44, 45 and 46. Note that the first row of each table indicate the item of each column and contents in parentheses indicate variables to which the items correspond.

An assumption is made that acquisition of information, of an event, the "Day" of which is June and "Coefficient of Number of Audience" is 0.5 or larger is instructed. Then, in node S1 columns including a character string "June" are extracted from the table shown in FIG. 42 that a table shown in FIG. 47 is output. On the other hand, in node S2 the table shown in FIG. 43 is as it is output. In node J1 rows containing the same year are formed into sets from the tables shown in FIGS. 47 and 43 that a table shown in FIG. 48 is output. In node S3 the table shown in FIG. 44 is as it is output. In node J2 columns of "Place" and "Institution" on the tables shown in FIGS. 48 and 44 to a comparison to form the rows containing the same place into sets so that a table shown in FIG. 49 is output. In node C1 a new column of the table shown in FIG. 49 which is input is produced. "Day" and "Institution" are, for each row, converted into the row of "Weather" by making a reference to data in node C1 so that a table shown in FIG. 50 is output. On the other hand, in node S4 rows in which the "Coefficient of Number of Audience" is 0.5 or larger are extracted from the table shown in FIG. 45 the table shown in FIG. 51 is output. In node C2 a new column shown in FIG. 45 which must be input is produced. Then, a reference is, for each row, made to data in node C2 from "Sunshine of Duration" and "Coefficient of Number of Audience" to be converted into rows of "Weather" and "Correction of Sales" so that a table shown in FIG. 52 is output. In node J3 rows of "Weather" and "Atmospheric Condition" are subjected to a comparison to form corresponding rows into a set so that a table shown in FIG. 53 is produced and output. In node S5 a table shown in FIG. 46 is as it is output. In node J4 rows of "Correction of Sales" and "Correction of Profit" are subjected to a comparison from the tables shown in FIGS. 53 and 46 that rows of the contents of "Correction of Sales" and the contents "Correction of Profit" having the same contents in the parenthesis are formed into a set. Thus, a table shown in FIG. 54 is produced and output. In node V1 the table shown in FIG. 54 is input and a process for displaying the table on the display is started.

FIG. 43 shows an example of element processes required to manufacture a certain product. An example of a process expression tree produced from the element processes is shown in FIG. 7. FIG. 7 shows an example in which parts $A output from supply process S1 and formed into one set-and parts $B output from supply process S2 and formed—into one set are input to joining process J1 so as to be joined. The parts $A and $B joined and formed into one set-are output. The output and parts $C and $D output from supply process S3 and formed into one set are input to joining process J2. The parts are input to joining process J2 so—as to be joined, and then parts $A, $B, $C and $D joined and formed into one set are output. As described above, the process expression tree is formed into a tree structure having the element processes as nodes and the nodes are connected to one another with oriented branches which are arrows having directions so that the processing order of the element processes are expressed. When the process expression tree is given, the process is started at the supply node and the condition that only the node to which arrival is permitted in the inverse direction of the input oriented branch and the process of which has been completed is satisfied to execute the process at an arbitrary node satisfying the condition. For example, the execution order can be determined in accordance with the following algorithm. The process is started at the end node, and the following process is performed for each node. That is, when arrival is made to a certain node, oriented branches input to the node are selected in an arbitrary order and the process of the node outputting the oriented branch is performed. When process of the nodes outputting all of the input oriented branches are completed, the process of the node is performed and the process of the node to which the oriented branch output from the node is continued. When the end process is ended as described above, all of the processes are ended.

Nodes of the process expression tree has various relationship of dependency. In an example case shown in FIG. 7, the—processing process C1 requires $A and $D as inputs, as shown in FIG. 41. $A can be obtained as an output from S1, while $D can be obtained as an output from S3. Therefore, $A and $D must be joined before the processing process C1 is performed. $A is joined with $B in the joining process J1, while $B is joined with $D in the joining process J2. Therefore, the joining processes J1 and J2 must be ended and $A and $B must be joined and $B and $D must be joined before the processing process C1 is performed. The joining process J3 requires $E and $H as inputs, as shown in FIG. 41. $E can be obtained as an output from C1, while $H can be obtained as an output from C2. Therefore, the processing processes C1 and C2 must be ended before the joining process J3. The joining process J4 requires $I and $J as inputs, as shown in FIG. 41. $I can be obtained as an output from C2, while $J can be obtained as an output from S5.)Therefore, the processing process C2 and the supply process S5 must be ended before the joining process J4.

In consideration of the relationship of dependency, a process expression tree indicating a procedure which can be performed must be produced.

As a conventional system for determining the manufacturing procedure for producing the process expression tree which, can be performed, an assortment and round robin method may be employed. The foregoing method forms all assortments which can be performed for the element processes exemplified in FIG. 41. Simulations of the formed assortments performed on a computer to select a process with which manufacture can be performed with contradiction.

As nodes for outputting the input to node V1 in a case shown in FIG. 41, eleven nodes S1, S2, S3, S4, S5, C1, C2, J1, J2, J3 and J4 can be considered. A case will be considered in which any one of S1, S2, S3, S4 and S5 is selected and an output from the selected node is connected as an input to the node V1. In an example case where S1 is selected, a structure composed of S1 and V1. formed as a result of the connection is 10 shown in FIG. 55. The foregoing structure does not have a oriented branch for furthermore receiving the output from another node. Therefore, the above-mentioned procedure cannot be executed. Therefore, a fact can be understood that S1, S2, S3, S4 and S5 are unsuitable as nodes for outputting the input to the node V1.

Therefore, C1 is selected as the node for outputting the input to the node V1i, a oriented branch output from C1 is connected as an input to the node V1. The foregoing structure is shown in FIG. 56. The foregoing structure is able to receive one oriented branch. Therefore, as the nodes to be connected to the above-mentioned structure, the following ten residual nodes can be considered: S1, S2, S3, S4, S5, C2, J1, J2, J3 and J4. Among the foregoing nodes, S1, S2, S3, S4 and S5 are unsuitable as the nodes to be connected to the table shown in FIG. 56 because of the same reason. Therefore, node J1 is selected and a oriented branch output from J1 is connected to the node C1. The foregoing structure is shown in FIG. 57. The above-mentioned structure is able to receive oriented branches output from two nodes selected from the residual nodes S1, S2, S3, S4, S5, C2, J1, J2, J3 and J4.

The above-mentioned procedure is repeated so that all of the joints which can be performed are used to produce candidates of the manufacturing procedure. An example of the thus-produced candidate of the manufacturing procedure is shown in FIG. 58. Simulations of the foregoing procedures are performed on the computer. When element process S1 has been ended, part $A is output. The output part $A is input to element process C2. However, the element process C2 is, as shown in FIG. 41, arranged to receive $F as an input to covert the same into $H and $I. Therefore, a fact can be understood as a result of the simulation that the above-mentioned candidate for the manufacturing procedure is unsuitable. As described above, simulations of the all of the manufacturing procedures are performed. As a result, a process with which manufacture can be performed without contradiction as shown in FIG. 7 can be selected.

Since the conventional system for determining the manufacturing procedure is structured as described above, all of joints of the element processes which can be performed are formed and simulations of the formed joints must be performed on a computer. The number of joints of the element processes shown in FIG. 41 can be calculated as follows: initially, the joints of node V1 and joining nodes J1, J2, J3 and J4 are considered. In this case, nodes patters are three types shown in FIGS. 59A to 59C.

In the case of FIG. 59A, the number of joints of J1, J2, J3 and J4 to J$i$, J$j$, J$k$ and J$l$ is 4×3×2×1=24. When supply nodes S1, S2, S3, S4 and S5 are assigned to five inputs to the joining nodes, the number of joints is 5×4×3×2×1÷2÷2=30. Since the right-hand and the left-hand are not distinguished for J$k$ and J$l$, division with two is required to correspond to J$k$ and J$l$. The number of joints in which C1 is assigned to each of the thus-formed structures by inserting the processing node to an arbitrary oriented branch is nine which corresponds to the number of oriented branches. The number of joints in which C2 is then assigned is ten which corresponds to the number of the oriented branches after C1 has been assigned. Therefore, the number of joints is 9×10=90. Therefore, the number of joints in the pattern in FIG. 59A is 24×30×90=64800.

In the case of FIG. 59B, the number of joints of J1, J2, J3 and J4 to J$i$, J$j$, J$k$ and J$l$ is 4×3×2÷2=12. Since J$l$ and J$k$ are resulted in the same pattern even if change is performed, division with two is required. When supply nodes S1, S2, S3, S4 and S5 are assigned to five inputs to the joining nodes, the number of joints is 5×4×3×2×1÷2÷2=30. Since the right-hand and the left-hand are not distinguished for J$k$ and J$l$, division with two is required to correspond to J$k$ and J$l$. The number of joints in which C1 is assigned to each of the thus-formed structures by inserting the processing node to an arbitrary oriented branch is nine which corresponds to the number of oriented branches. The number of joints in which C2 is then assigned is ten which corresponds to the number of the oriented branches after C1 has been assigned. Therefore, the number of joints is 9×10=90. Therefore, the number of joints in the pattern in FIG. 59B is 12×30×90=32400.

In the case of FIG. 59C, the number of joints of J1, J2, J3 and J4 to J$i$, J$j$, J$k$ and J$l$ is 4×3×2×1=24 When supply nodes S1, S2, S3, S4 and S5 are assigned to five inputs to the joining nodes, the number of joints is 5×4×3×2×1÷2=24. Since the right-hand and the left-hand are not distinguished for J$l$, division with two is required to correspond to J$k$ and J$l$. The number of joints in which C1 is assigned to each of the thus-formed structures by inserting the processing node to an arbitrary oriented branch is nine which corresponds to the number of oriented branches. The number of joints in which C2 is then assigned is ten which corresponds to the number of the oriented branches after C1 has been assigned. Therefore, the number of joints is 9×10=90. Therefore, the number of joints in the pattern in FIG. 59C is 24×24×90=51840. As a result, the total number of the joints is 64800+32400+51840=149040. Since the convention system is structured as described above, the number of joints increases excessively. Thus, there arises a problem in that excessively long time is required to perform simulations of all of the patterns on the computer.

SUMMARY OF THE INVENTION

The present invention is established to overcome the above-mentioned problem and a first object of the present invention is to provide a system for efficiently determining a process expression tree expressing the procedure of the processes shown in FIG. 2 as an example to enable a part supplied in the supply process is allowed to flow to an end process without contradiction when an element process composed of four types of processes shown in FIGS. 32 to 35 for forming the manufacturing procedure and shown in FIG. 41 is given. A second object is to provide a system for efficiently determining a process expression tree expressing the procedure of the processes shown in FIG. 2 as an example to enable data joint be performed such that a part supplied in the supply process is allowed to flow to an end process without contradiction when an element process composed of four types of processes shown in FIGS. 32 to 35 for forming the data unifying procedure and shown in FIG. 41 is given.

A third object is to provide a data unifying procedure determining system which is capable of efficiently determining a process expression tree for performing .a necessary and sufficient processes without acquisition of needless additional information in a case where only a required information is instructed to be require.

A fourth object is to provide a data unifying procedure determining system which is capable of determining a proper joining method by selecting from outer join and inner join when a plurality of tables are joined.

A fifth object is to provide a data unifying procedure determining system which is capable of determining a proper joining method by selecting from outer join and inner join when retrieving conditions are given.

A sixth object is to provide a data unifying procedure determining system which is capable of saving a data storage region, and shortening time required to complete the data joining process about required information.

A seventh object is to provide a data joining process determining system which is capable of saving a data storage region and shortening time required to complete the data joining process about additional information.

Article manufacturing procedure determining system having first to third structures of the present invention is formed such that when an element process is given, node connection means produces an initial graph, initially-required node selection means selects required nodes, initial graph producing means produces an initial graph corresponding to each element process and composed of nodes and oriented branches, dependency graph producing means deforms the initial graph to produce a dependency graph and process expression tree producing means deforms the dependency graph to produce a process expression tree for expressing a manufacturing procedure which can be executed.

Data unifying procedure determining system having second to fourth structures of the present invention is formed such that when an element process is given, node connection means produces an initial graph, initially-required node selection means selects required nodes, initial graph producing means produces an initial graph corresponding to each element process and composed of nodes and oriented branches, dependency graph producing means deforms the initial graph to produce a dependency graph and process expression tree producing means deforms the dependency graph to produce a process expression tree for expressing a data unifying procedure which can be executed.

Data unifying procedure determining system having a fifth structure of the present invention is formed such that when additional information is instructed to be required in addition to required information, processing node changing means and additional node absorbing means do not perform any process, final node absorbing means produces a oriented branch extending from the apex of a tree structure of a sole cluster toward a node corresponding to the end process and deletes oriented branches except the oriented branch extending from the node at the apex of the tree structure of the sole cluster toward the node corresponding to the end process.

Data unifying procedure determining system having sixth and seventh structures of the present invention is formed such that when all nodes of the process expression tree at which arrival can be made by, in the forward direction, moving the oriented branch from the node on the connection path for connecting the initially-required nodes to each other and all nodes at which arrival can be made by, in an inverted direction, moving the oriented branch from the node on the connection path for connecting the in nodes to each other are made to be required nodes, tables output from the required nodes are made to be required tables and tables output from nodes except for the required nodes are made to be additional tables, outer join of joining nodes to each of which one required table and one additional table are input is performed and inner join of joining nodes to each of which two required tables are input is performed.

Data unifying procedure determining system having an eighth structure of the present invention is formed such that initially-required node selection means makes a supply node for outputting a table including a column having a retrieval condition to be an initially-required node, and when all nodes of the process expression tree at which arrival can be made by, in the forward direction, moving the oriented branch from the node on the connection path for connecting the initially-required nodes to each other and all nodes at which arrival can be made by, in an inverted direction, moving the oriented branch from the node on the connection path for connecting the initially-required nodes to each other are made to be required nodes, tables output from the required nodes are made to be required tables and tables output from nodes except for the required nodes are made to be additional tables, outer join of joining nodes to each of which one required table and one additional table are input is performed, full outer join of joining nodes, to each of which two required tables are input and which have only comparative columns for joining have retrieval conditions and inner join of joining nodes except for the above-mentioned nodes to each of which two required tables are input is performed.

Data unifying procedure determining system having a ninth structure of the present invention the required node absorbing means searches one node from all nodes to which oriented branches output from nodes instructed as factors are input in accordance with a given priority order, a first priority is given to a joining node which has the "required node flag" which has not been turned on and to which one oriented branch is input and a second priority order is given to a processing node including a joining node among nodes to which arrival can be made by, in the forward direction, moving the oriented branch. Data unifying procedure determining system having a tenth structure of the present invention when the additional node absorbing means searches one node from all nodes to which oriented branches output from an instructed node as a factor is input in accordance with a given priority order, a first priority order is given to a joining node to which one oriented branch is input and a second priority order is given to other nodes.

BRIEF DESCRIPTION OF THE DRAWINGS

FIG. 20 is a diagram showing an example of a joining method according to a sixth embodiment of the present invention.

FIG. 25 is a diagram showing an output table from node S7 according to the seventh embodiment of the present invention.

FIG. 26 is a diagram showing an output table from node J5 according to the seventh embodiment of the present invention.

FIG. 27 is a diagram showing a table produced by inner-joining the tables shown in FIGS. 23 and 25 according to the seventh embodiment of the present invention.

FIG. 28 is a diagram showing a table produced by retaining the table shown in FIG. 23 and by outer-joining the table and the table shown in FIG. 25 according to the seventh embodiment of the present invention.

FIG. 29 is a diagram showing a table produced by retaining the table shown in FIG. 25 and by outer-joining the table and the table shown in FIG. 28 according to the seventh embodiment of the present invention.

FIG. 36 is a diagram showing a table of a conventional data unifying procedure determining means.

FIG. 37 is a diagram showing a table relating to the table shown in FIG. 36 and according to the conventional data unifying procedure determining means.

FIG. 38 is a diagram showing a table formed by joining the tables shown in FIGS. 36 and 37 and according to the conventional data unifying procedure determining means.

FIG. 39 is a diagram showing a table processed obtained by processing the table shown in FIG. 36 by the joining node according to the conventional data unifying procedure determining means.

FIG. 40 is a diagram showing a table obtained by processing the table shown in FIG. 36 and according to the conventional data unifying procedure determining means.

FIG. 44 is a diagram showing the contents of source for supplying information of node S3 of data unifying procedure determining means.

FIG. 45 is a diagram showing the contents source for supplying information of node S4 data unifying procedure determining means.

FIG. 46 is a diagram showing the contents of source for supplying information of node S5 of data unifying procedure determining means.

FIG. 47 is a diagram showing an example of an output table from node S1 of the conventional data unifying procedure determining means.

FIG. 48 is a diagram showing an example of an output table from node J1 of the conventional data unifying procedure determining means.

FIG. 49 is a diagram showing an example of an output table from node J2 of the conventional data unifying procedure determining means.

FIG. 50 is a diagram showing an example of an output table from node C1 of the conventional data unifying procedure determining means.

FIG. 51 is a diagram showing an example of an output table from node S1 of the conventional data unifying procedure determining means.

FIG. 52 is a diagram showing an example of an output table from node C2 of the conventional data unifying procedure determining means.

FIG. 53 is a diagram showing an example of an output table from node J3 of the conventional data unifying procedure determining means.

FIG. 54 is a diagram showing an example of an output table from node J4 of the conventional data unifying procedure determining means.

DETAILED DESCRIPTION OF THE PREFERRED EMBODIMENTS

First Embodiment

Figure 1:
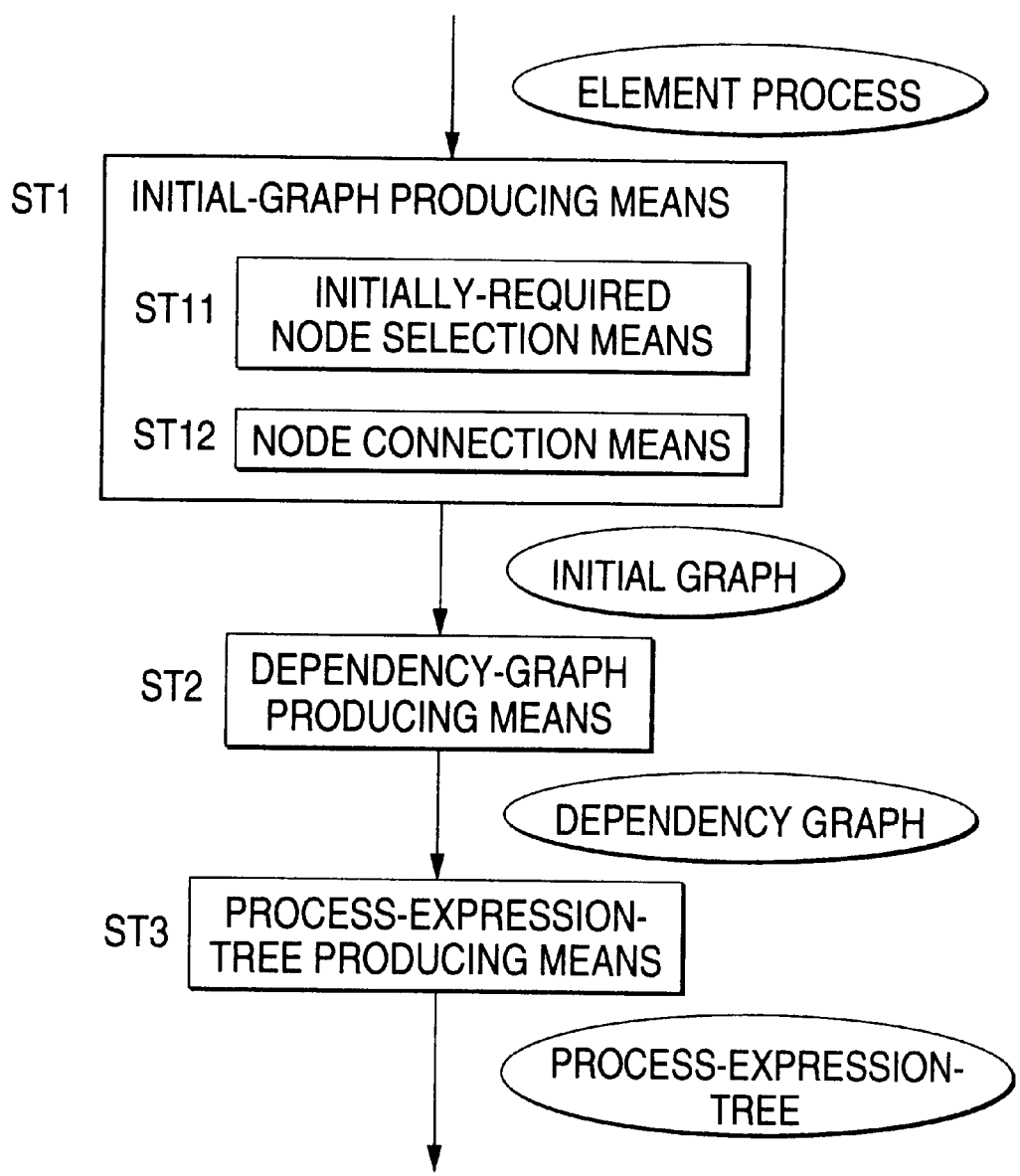
FIG. 1 is a flow chart showing a means according to a first embodiment of the present invention.
Figure 2:
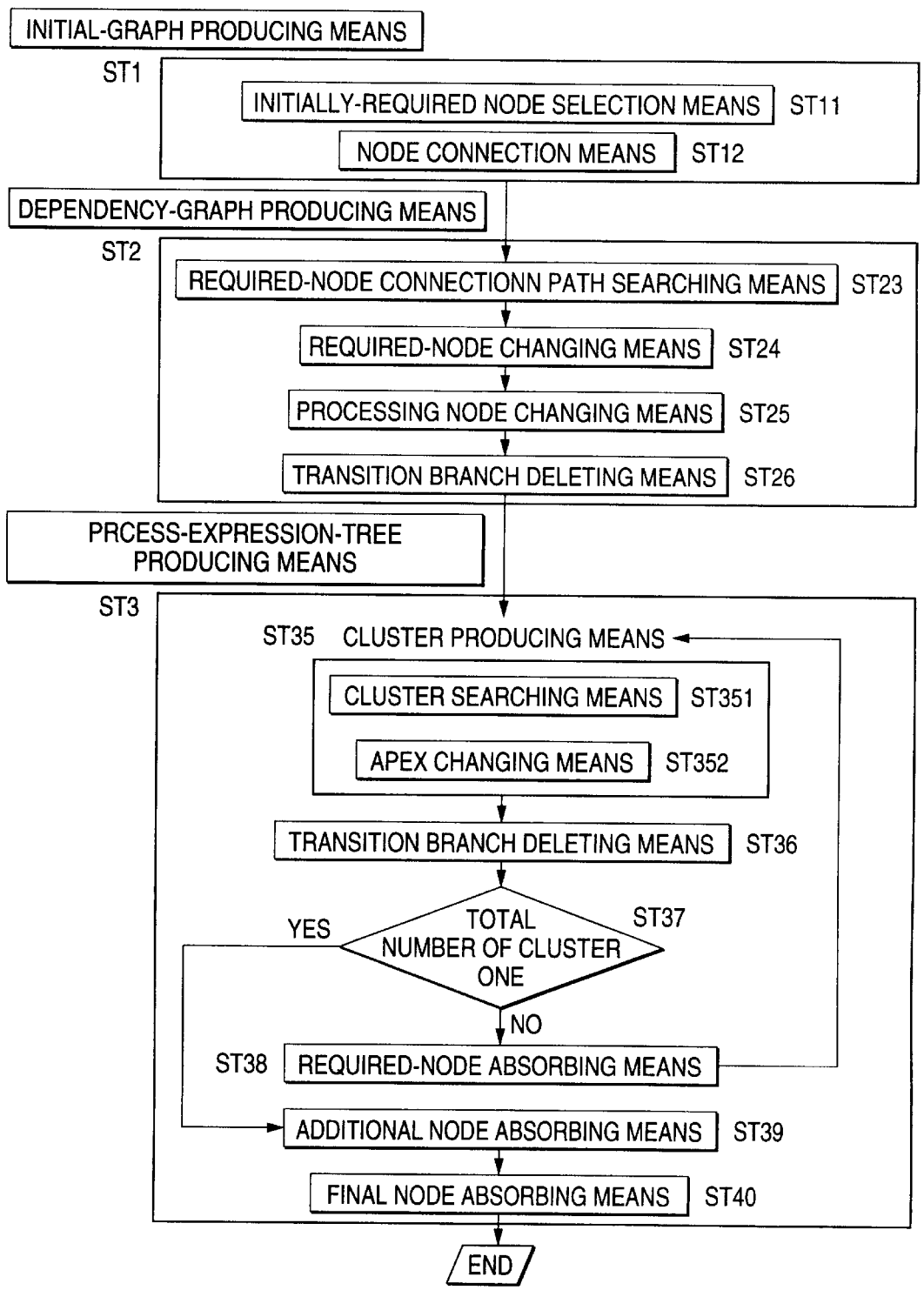
FIG. 2 is a flow chart showing a means according to a second embodiment of the present invention.

The structure of a first embodiment of the present invention will now be described. A means according to this embodiment of the present invention is shown in a flow chart shown in FIG. 1. The schematic structure of the present invention is as follows: An initial graph producing means produces an initial graph in accordance with given element processes. Then, a dependency graph producing means converts the initial graph to produce a dependency graph. Finally, a process expression tree producing means converts the dependency graph so that a process expression tree is produced. Referring to FIG. 1, each means of the present invention will now be described.

Figures 41, 42, 43:
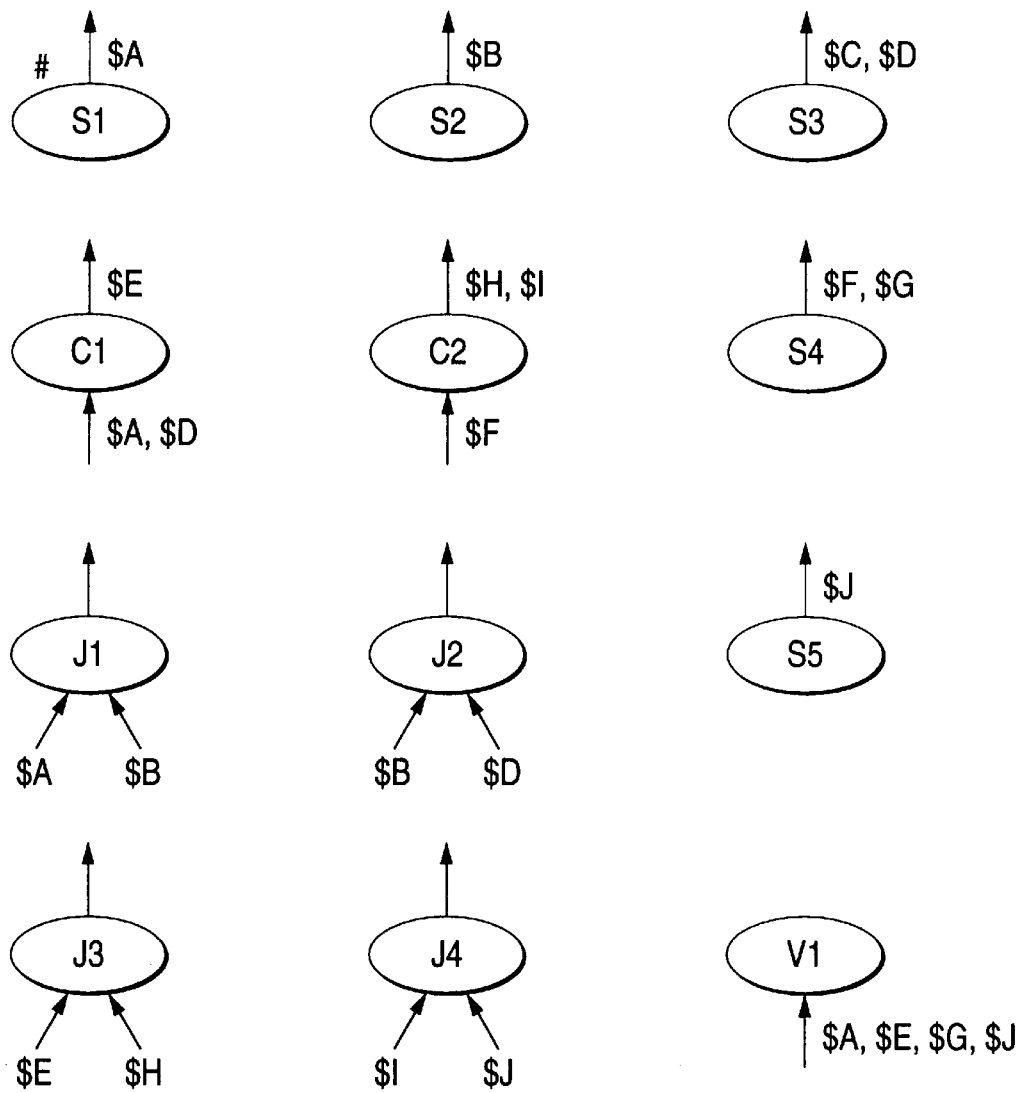
FIG. 41 is a diagram showing an example of an element process of the conventional manufacturing procedure determining means.
FIG. 42 is a diagram showing the contents of an information source for supplying information of node S1 of the conventional data unifying procedure determining means.
FIG. 43 is a diagram showing the contents of an information source for supplying information of node S2 of the conventional data unifying procedure determining means.
Figure 55:
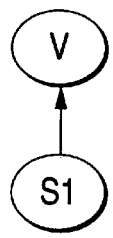
FIG. 55 is a diagram showing an example of an unsuitable structure between nodes of the conventional manufacturing procedure determining means.
Figure 56:
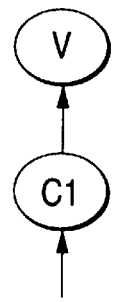
FIG. 56 is a diagram showing an example of a possible structure between nodes of the conventional manufacturing procedure determining means.
Figure 57:
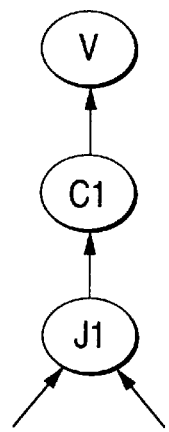
FIG. 57 is a diagram showing a possible structure between nodes of the conventional manufacturing procedure determining means.
Figure 58:
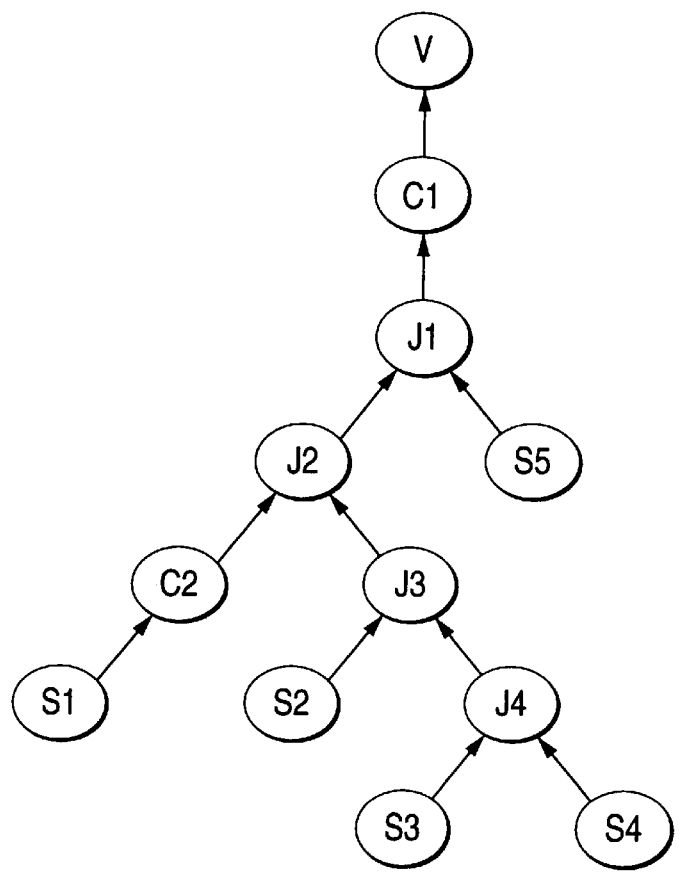
FIG. 58 is a diagram showing an example of a candidate of a process expression tree of the conventional manufacturing procedure determining means.
Figure 59A:
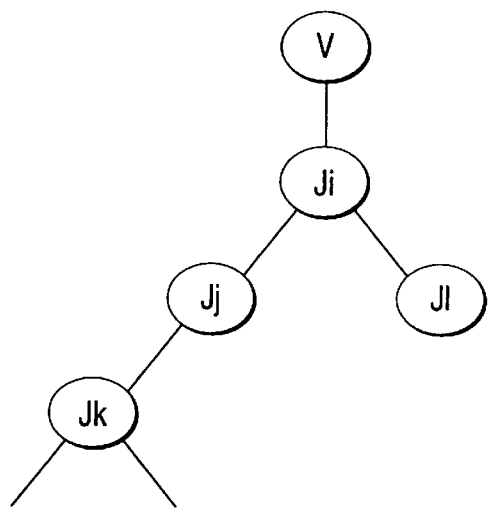
FIGS. 59A to 59C are diagrams showing a pattern of a joining node of the conventional manufacturing procedure determining means.
Figure 59B:
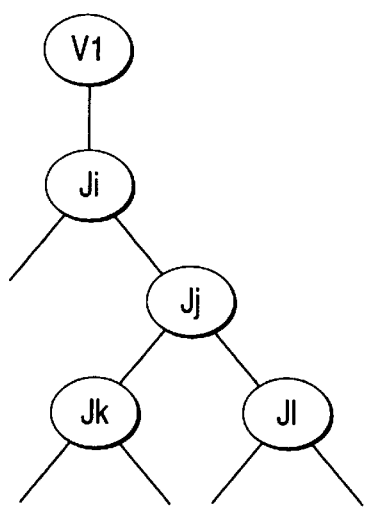
Figure 59C:
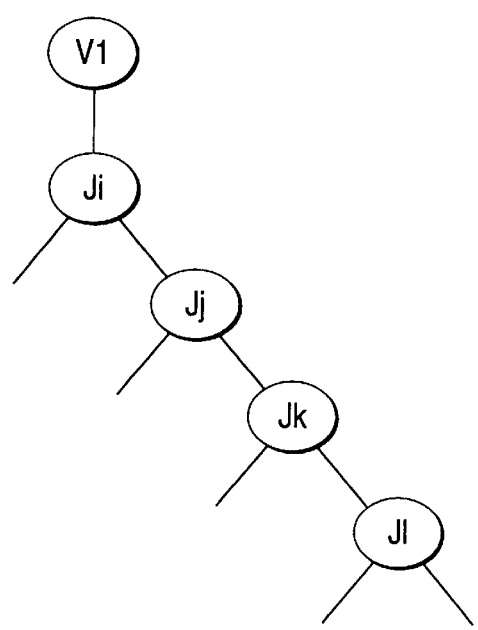

The initial graph producing means in step ST1 is composed of a initially-required node selection means in step ST11 and node connection means in step ST12. The initially-required node selection means in step ST11 selects a node for outputting a part which is required in the end node among the supply nodes or the processing nodes and the selected node is made to be an initially-required node. In the case shown in FIG. 41 an assumption is made that parts $A and $G are parts which are required in end process V1 and that node S1 for outputting the part $A and S4 for outputting the part $G have been selected as the initially-required nodes. The selected nodes are given "#" to indicate the initially-required node. Parts which are instructed as an input for the end process V1 and which are not included in the initially-required node are used if they are obtained. If they cannot be obtained, no problem arises.

Figures 3, 4:
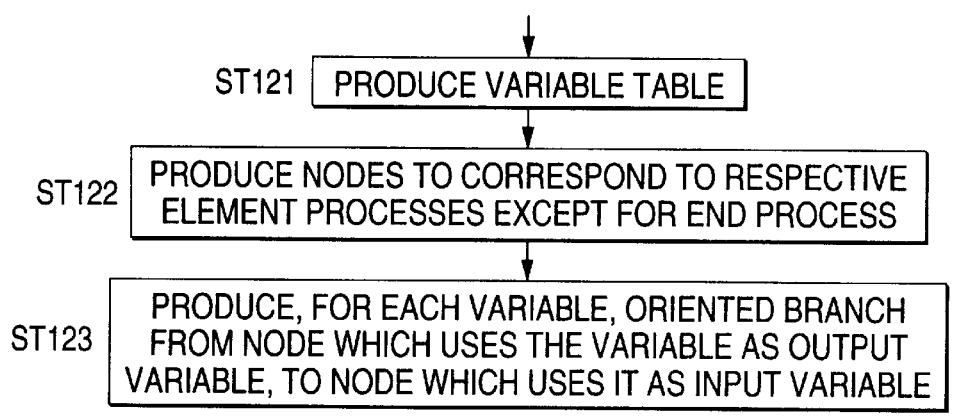
FIG. 3 is a table showing variables according to the first embodiment of the present invention.
FIG. 4 is a flow chart flow showing a node connection means according to the first embodiment of the present Invention.

The node connection means in step ST12 will now be described. FIG. 4 shows an example of a procedure for realizing the node connection means. In step ST121 a variable table exemplified in FIG. 3 is produced. In the table shown in FIG. 3 a first row indicates name of a part for use in each element process shown in FIG. 41. Name of a part will be called a variable. A second row indicates an element process in which each variable on the first row is used as an output variable. For example, variable $A is output in supply process S1. Therefore, the column of the second row corresponding to the variable $A is made to be S1. A third row is an element process in which each variable on the first row is used as an input variable. For example, in a case shown in FIG. 41, variable $A is output in supply process S1. Therefore, the column of the second row corresponding to variable SA is made to be S1. In processing process C1 and joining process J1, variable $A is input. Therefore, the column of the third row corresponding to variable $A is made to be C1 and J1. In step ST122 a node is produced for each element process except for the end process shown in FIG. 41. Then, reference to the node corresponding to the element process is made with the name of the element process. For example, a reference to the node corresponding to the element process S1 is called as node S1. In step ST123 the variables on the first rows shown in FIG. 3 are sequentially selected, and then a oriented branch is produced from the node in which the variable is used as the output variable toward the node corresponding to the process in which the variable is used as the input variable. However, if the oriented branch has been produced between the above-mentioned nodes, no overlapped oriented branch is produced. In an example case of variable $A, a oriented branch is produced from node S1 for using $A as the output variable toward node C1 for using $A as input variable. Moreover, a oriented branch is produced from node S1 for using $A as output variable toward node J1 for using SA as input variable. The node producing means produces an initial graph shown in FIG. 5 from the element process shown in FIG. 41.

The dependency graph producing means in step ST2 will now be described. In the initial graph shown in FIG. 5, the parts which are input to the processing node C2 have been formed into one set before the process in C2 is performed. Therefore, one oriented branch is input to C2. However, the parts which are input to the processing node C1 have been divided into two sets and two oriented branches are input to C2. Therefore, the parts, which are input to C1, must be joined into one set with node J1 and node J2 before the process in C1. Thus, oriented branch E (J1, C1) and oriented branch E (J2, C1) are produced. Thus, for example, the oriented branch E (S1, J1) and oriented branch E (J1, C1) have realized the execution order relationship in which node C1 is performed after node S1. Since the oriented branch E (S1, C1) become unnecessary, it is deleted. Similarly, a-i-se oriented branch E (S3, C1) is deleted. As a result, a dependency graph shown in FIG. 6 is produced.

Figure 6:
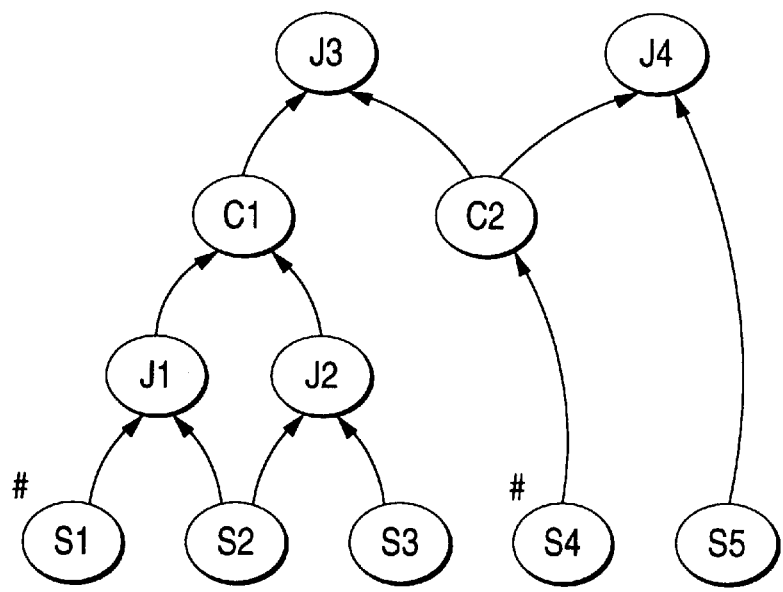
FIG. 6 is a diagram showing a dependency graph according to the first embodiment of the present invention.
Figure 7:
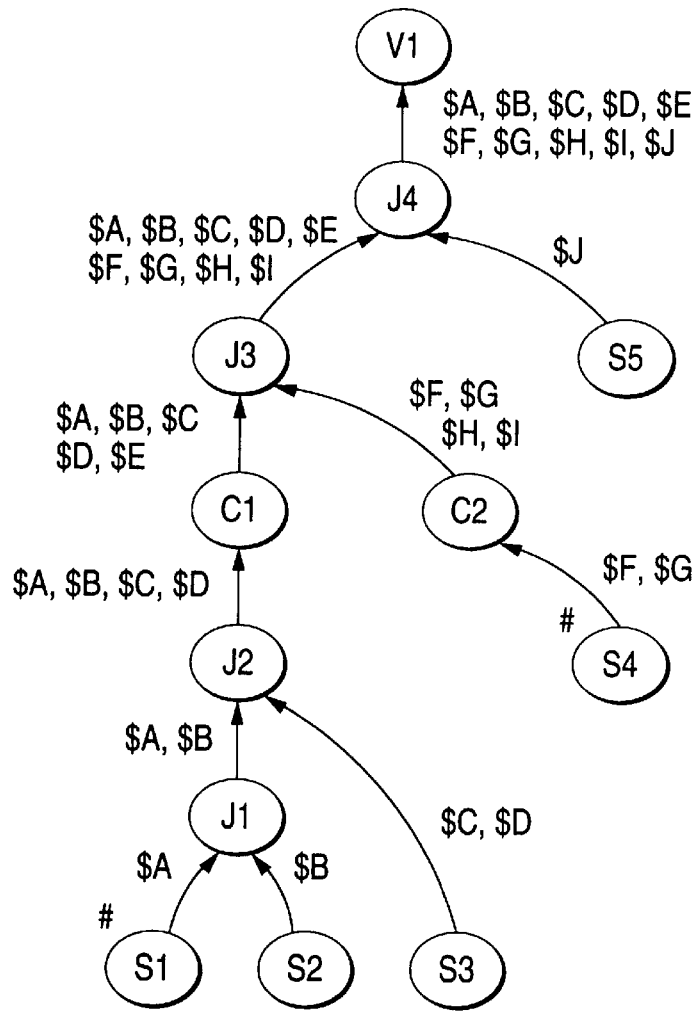
FIG. 7 is a diagram showing a process expression tree according to the first embodiment of the present invention.

The process expression tree producing means in step ST3 will now be described. In the dependency graph shown in FIG. 6, two oriented branches are output from node C2 and node S2. Two oriented branches are input to processing node C1. Therefore, oriented branch E (J1, J2) is newly produced, and oriented branch E (S2, J2) and oriented branch E (J1, C1) are deleted. Oriented branch E (J3, J4) is newly produced, and oriented branch E (C2, J4) is deleted. As a result, a process expression tree shown in FIG. 7 is produced. The manufacturing procedure determining means according to the present invention is formed such that when an element process is given, the node connection means produces the initial graph, the initially-required node selection means selects a required node, the initial graph producing means uses nodes corresponding to the element processes and oriented branches to produce the initial graph, the dependency graph producing means deconstructs the initial graph to produce a dependency graph and the process expression tree producing procedure deforms the dependency graph so that a process expression tree expressing a manufacturing procedure, which can be performed, is produced.

Second Embodiment

In the second structure of the present invention, examples of the contents of information sources of the supply nodes S1, S2, S3, S4 and—S5 are shown in FIGS. 42, 43, 44, 45 and 46. An assumption is made that information of an event satisfying that the day of the event is "Sunday" and the "Coefficient of Number of Audience" is 0.5 or more is obtained. Although the operation is the same as that according to the first embodiment except for step ST11 in which the following process is performed. Information of "Day" is acquired from node S1, while "Coefficient of Number of Audience" is acquired from node S4. Therefore, the initially-required node selection means in step ST11 selects node S1 and node S4 as initially-required node. The data unifying procedure determining means according to the present invention is formed such that when an element process is given, the node connection means produces the initial graph, the initially-required node selection means selects a required node, the initial graph producing means uses nodes corresponding to the element processes and oriented branches to produce the initial graph, the dependency graph producing means deforms the initial graph to produce a dependency graph and the process expression tree producing procedure deforms the dependency graph so that a process expression tree expressing a data unifying procedure, which can be performed, is produced. Therefore, the necessity of forming all of joints for the element processes and performing simulations of the formed joints on a computer can be eliminated.

Third Embodiment

A third structure of the present invention will now be described. The operation in step ST1 is similar to that of the first embodiment. The dependency graph producing means in step ST2 will now be described. A required-node column path searching means in step ST23 connects all of the initially-required nodes with one another and searches paths including no loop. To achieve this, the following method is employed. That is, one initially-required node is selected from all of the initially-required nodes. The paths connected the selected node and each initially-required nodes except for the selected node are searched. All of the searched paths are added so that a required connection path is obtained. The path connecting the selected initially-required node and another initially-required node to each other can be detected by the following method. That is, one node to which arrival is permitted by moving along one oriented branch starting from the selected node is selected. A "selection completion" flag of the selected node is turned on. Then, a node to which arrival is permitted by moving along one oriented branch from the foregoing node is selected. At this time, the oriented branch, along which the movement has been performed, is not used in the moving operation. The node having the "selection completion" flag which has been turned on is not selected any more. In a case where the node at which arrival has been performed and which has not any new oriented branch along which tracing is permitted, tracing of the oriented branch which has first arrived at the node is performed in an inverted direction. Then, a new oriented branch output from the node at which arrival has been made is traced. The above-mentioned procedure is repeated until tracing arrives at the other one initially-required node, tracing of oriented branches through which first arrival at the nodes is sequentially performed in the inverted direction so that tracing is returned to the selected initially-required node. The path through which tracing of the oriented branches in the inverted direction is the connection path which connects the selected initially-required node and the other One initially-required node to each other. Finally, all of the selection completion" flags are reset.

Figure 5:
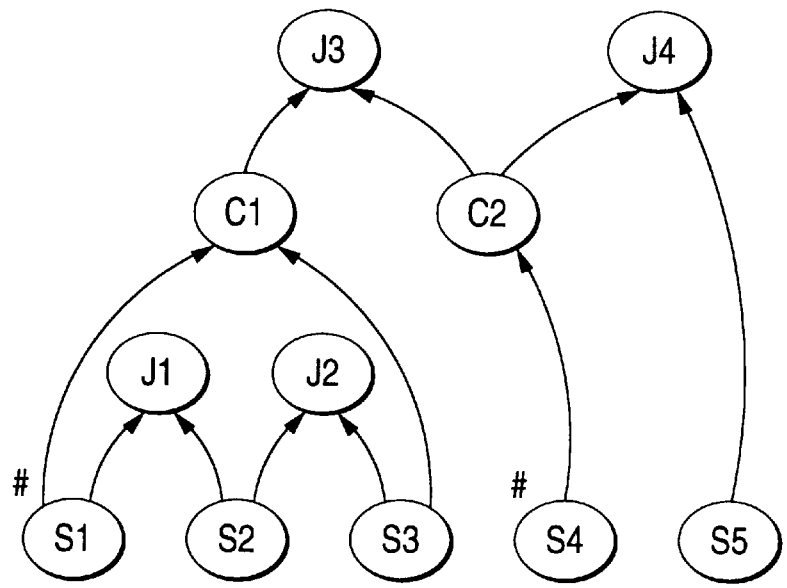
FIG. 5 is a diagram showing an initial graph according to the first embodiment of the present invention.

In an example case shown in FIG. 5, S1 is selected from all of initially-required nodes as an arbitrary initially required node. Then, paths for connecting selected S1 and S4 which is the other initially-required node is detected. Although only one path exists through which tracing is performed in this case, addition of respective paths enables a required connection path to be obtained if two or more paths are detected. The path for connecting the selected initially-required node S1 and the other initially-required S4 can be detected by the following method: the oriented branch extending from node n1 toward n2 is expressed as E (n1, n2). Tracing is started at the selected node S1 and tracing of one oriented branch E (S1, C1) is performed so that arrival at node C1 is made. At this time, the "selection completion" flag of C1 is not turned on. Therefore, node S3, at which arrival can be made by tracing one oriented branch from C1, is selected. Similarly, nodes J2, S2 and J1 are sequentially selected. Although an attempt is then made to select node S1, the "selection completion" flag of S1 has been turned on. Therefore, selection of S1 cannot be performed. Since no new oriented branch exists at J1 except for the oriented branch E (S2, J1) through which tracing has been performed when arrival at J1 has been made, tracing of the oriented branch E (S2, J1) in the inverse direction is performed to return to S2. Since no new oriented branch exists at S2, tracing of the oriented branch E (S2, J2) through which tracing has been performed when arrival at S2 has been made is performed in the inverse direction to return to J2. Similarly, returning to S3 is performed, and that to C1 is performed. Since a new oriented branch E (C1, J3) exists at C1, tracing of the foregoing oriented branch is performed. Similarly, tracing of C2 and C4 is performed. Node S4 is the initially-required node which is the required node. Then, tracing of the oriented branch E (S4, C2), through which tracing has been performed when first arrival at S4 has been made, is performed in the inverse direction to return to C2. Then, tracing of the oriented branch E (C2, J3), through which tracing has been performed when first arrival at C2 has been made, is performed in the inverse direction to return to J3. Similarly, return table the initially-required node S1, which has been selected first, is performed in the sequential order as C1 and S1. The paths (S4, C2, J3, C1 and S1) through which tracing of the oriented branches is performed in the inverse direction are connection paths for connecting the selected initially-required node S1 and the other one initially-required node S4. Finally, the set "selection completion" flag is reset.

Then, the nodes on all of—the connection paths detected by the required node connection path searching means in step ST23 are sequentially selected. Then, the required node changing means is turned on for each of the selected nodes by using the node as a factor.

Figure 9:
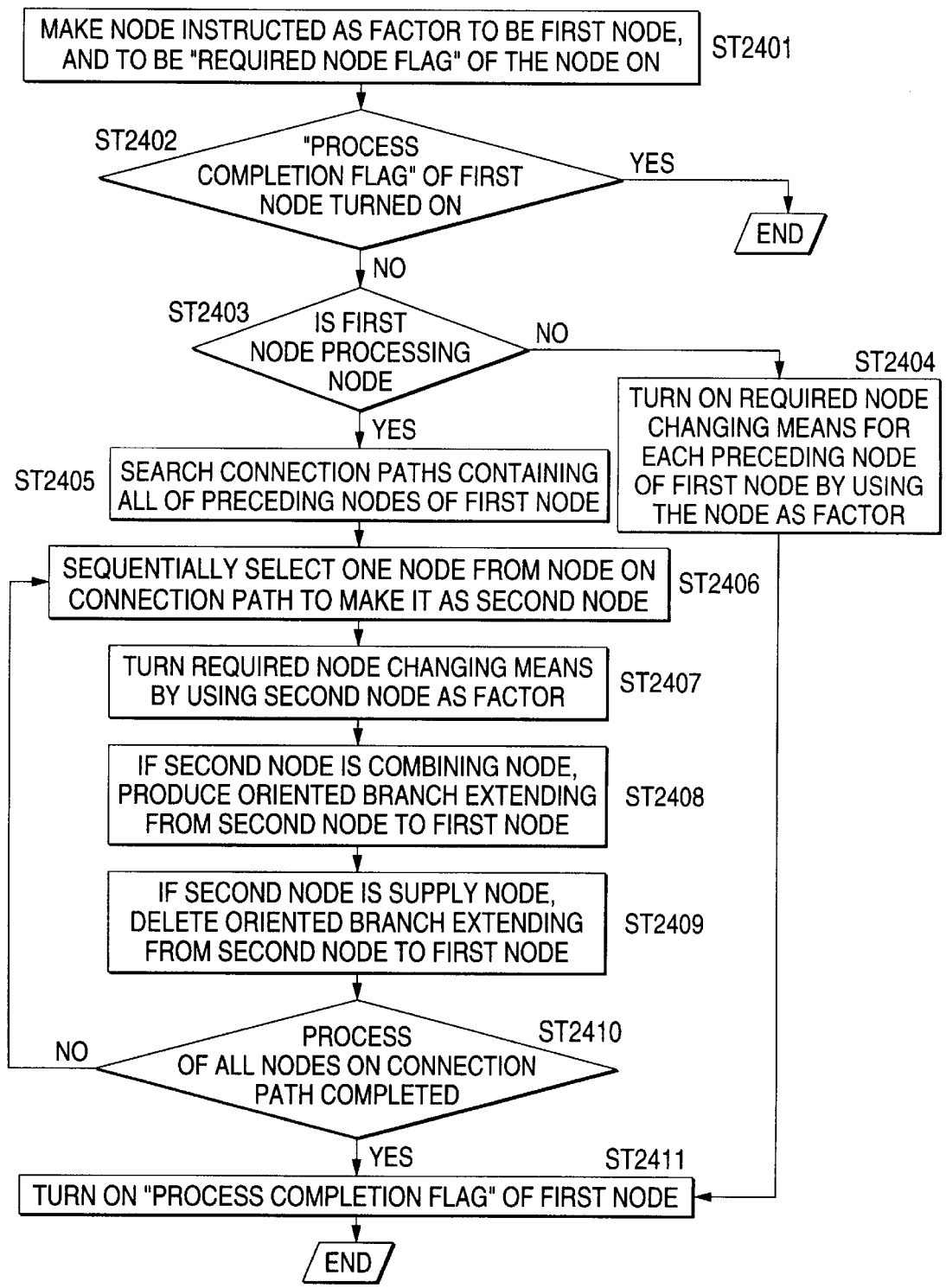
FIG. 9 is a flow chart showing an example of a required node changing means according to a third embodiment of the present invention.

An example of the required node changing means in step ST24 will now be described with reference to a flow chart shown in FIG. 9. In step ST2401 the node instructed as a factor is made to be a first node and a "required node flag" indicating that the node is a required node is turned on. However, the terms "first node" and "second node" hereinafter indicate the nodes which have been previously set in the means in which the term has been used. Assuming that node n1 is set as a first node in a means A, and then a means B is turned on from the means A, and then node n2 is set as a first node in the means B, the first node indicates n2. Another assumption is made that the means B is ended and a reference to the first node is made in the means A. At this time, the first node indicates n1. If the "selection completion" flag of the first node has been turned on in step ST2402, the process is ended. If the flag has not been turned on, the operation proceeds to step ST2403. If the first node is not a processing node in step ST2403, the operation proceeds to step ST2404. If the node is the processing node, the operation proceeds to step ST2405. Instep ST2404 the required node changing means is turned on by using the preceding node as a factor on an assumption that the node from which a oriented branch is directly extended toward the first node is made to be the preceding node. Then, the operation proceeds to step ST11. In step ST2405 a connection path for connecting the preceding node of the first node and having no first node is detected. In step ST2406 the nodes on the detected connection paths are sequentially selected one by one. The selected node is called as a second node. In step ST2407 the second node is used as a factor to turn the required node changing means on. If the second node is a joining node in step ST2408, then a oriented branch extending from the second node toward the first node is produced. If the second node is a supply node in step ST2409, the oriented branch extending from the second node to the first node is deleted. If all of the nodes on the connection paths have not been selected in step ST2410, the operation proceeds to step ST2406. If all nodes have been selected, the operation proceeds to step ST2411. In step ST2411 the "selection completion" flag of the first node is turned on and the process is ended.

In an example case shown in FIG. 5 in which node C1 is used in step ST2 to turn the required node changing means on in step ST24, the following operation is performed. In step ST2401 node C1 is made to be the first node, and the "required node flag" of the node C1 is turned on. Since the "selection—completion" flag of the node C1 has not been turned on in step ST2402,—the process is not ended and the operation proceeds to step ST2403. Since the node C1 is a processing node in step ST2403, the operation proceeds to step ST2405 so that a connection path for connecting the nodes S1 and S3, which are all nodes from which the oriented branches are extended toward the node C1, to each other is detected. The detection of the connection path can be performed by the method employed by the required node column path searching means. As a result, paths connecting S1, J1, S2, J2 and S3 are detected as the connection paths. In step ST2406 one node is selected from S1, J1, S2, J2 and S3 which are nodes on the detected path. The node, which is selected first is made to be S1, and S1 is called as a second node. In step ST2407 S1, which is the second node, is used as a factor to turn the required node changing means on. Since S1 is a supply node in step ST2408, no process is performed. Since Si is a supply node in step ST2409, the oriented branch E (S1, C1) extending from S1 to C1, which is the first node, is deleted. Since a node, which has not been processed, exists in S1, J1, S2, J2 and S3 in step ST2410, the operation proceeds to step ST2406. In step ST2406 the node J1 is, as a next node, selected from S1, J1, S2, J2 and S3 which are node on the detected path, the selected node J1 being called as the second node. In step ST2407 J1, which is the second node, is used as a factor to turn the required node changing means on. Since J1 is a joining node in step ST2408, a oriented branch E (J1, C1) extending from J1 to C1, which is the first node, is produced. Since J1 is a joining node in step ST2409, no process is performed. Similar processes are performed so that S2, J2 and S3 are sequentially selected from S1, J1, S2, J2 and S3 which are nodes on the detected path and then a similar process is performed. Finally, the "selection completion" flag of C1, which is the first node, is turned on in step ST2411. Then, nodes, which do not exist on the connection path detected by the required node connection path-searching means in step ST23 and which have the required node flag which has not been turned on, are sequentially selected. Then, the processing node changing means is turned on for each of the selected node by using the node as a factor.

An example of the process, which is performed by the processing node changing means in step ST25, will now be described with reference to a flow chart shown in FIG. 9. In step ST2501 the node given as a factor is made to be a first node. If the "selection completion" flag of the first node has been set in step ST2502, the process is ended. If the flag has not been turned on, the operation proceeds to step ST2503. If the first node is not the processing node in step ST2503, the operation proceeds to step ST2504. If the node is the processing node, the operation proceeds to step ST2505. In step ST2504 the required node changing means is turned on by using the preceding node as a factor on an assumption that the node from which a oriented branch is directly extended toward the first node is made to be the preceding node. Then, the operation proceeds to step ST2511. In step ST2505 a connection path for connecting the preceding node of the first node and having no first node is detected. In step ST2506 the nodes on the detected connection paths are sequentially selected one by one. The selected node is called as a second node. In step ST2507 the second node is used as a factor to turn the required node changing means on. If the second node is a joining node in step ST2508, then a oriented branch extending from the second node toward the first node is produced. If the second node is a supply node in step ST2509, the oriented branch extending from the second node to the first node is deleted. If all of the nodes on the connection paths have not been selected in step ST2510, the operation proceeds to step ST2506. If all nodes have been selected, the operation proceeds to step ST2511. In step ST2511 the "selection completion" flag of the first node is turned on and the process is ended.

Figure 8:
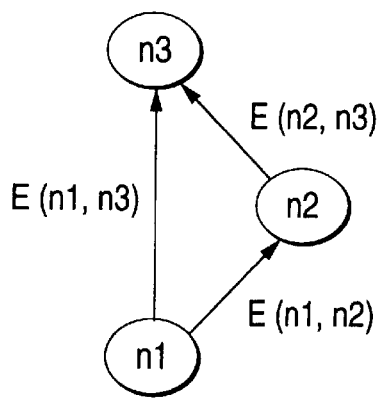
FIG. 8 is a diagram showing an example of a redundant oriented branch according to the first embodiment of the present invention.
Figure 10:
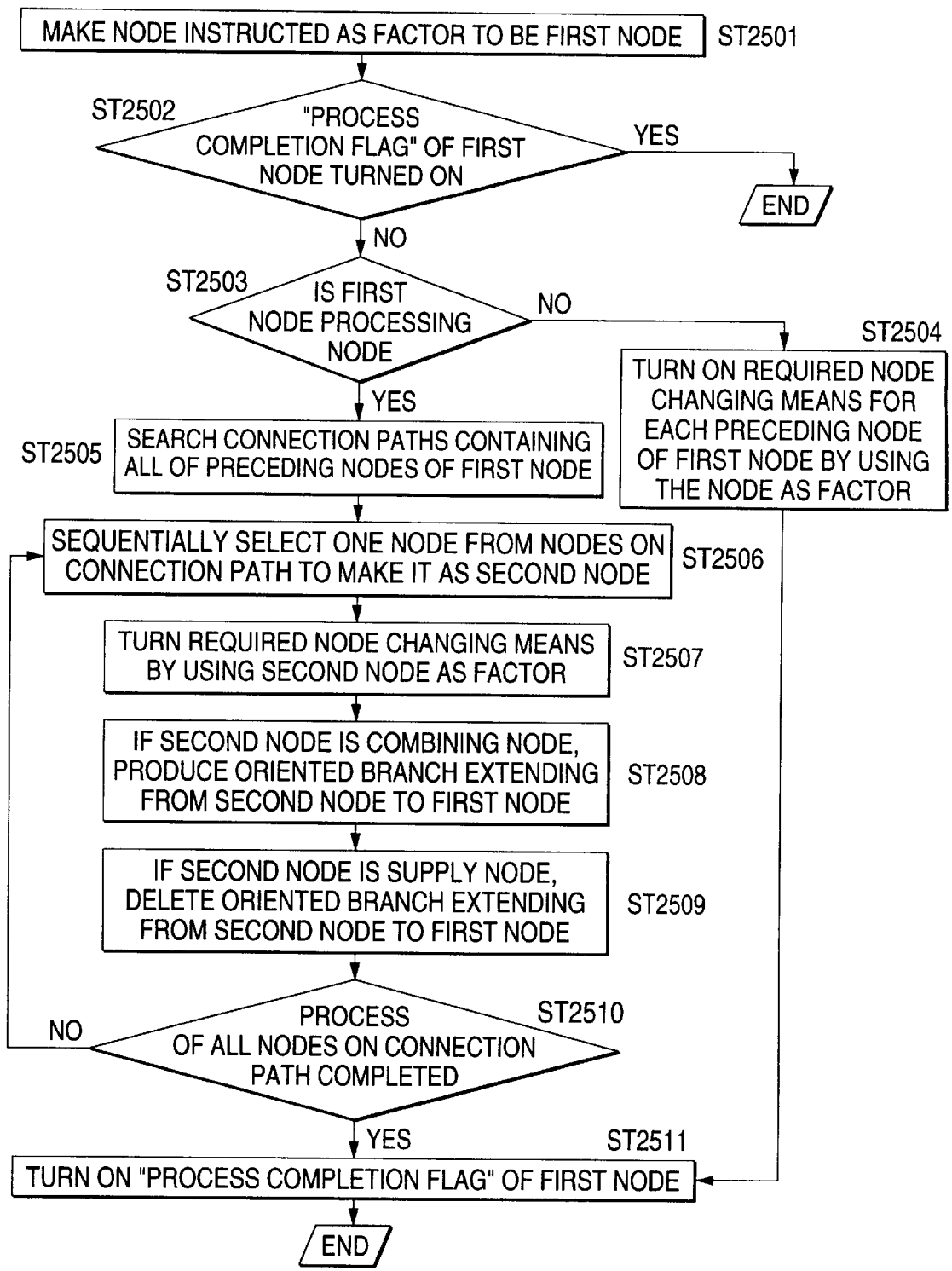
FIG. 10 is a flow chart showing an example of the required node changing means according to a third embodiment of the present invention.
Figure 11:
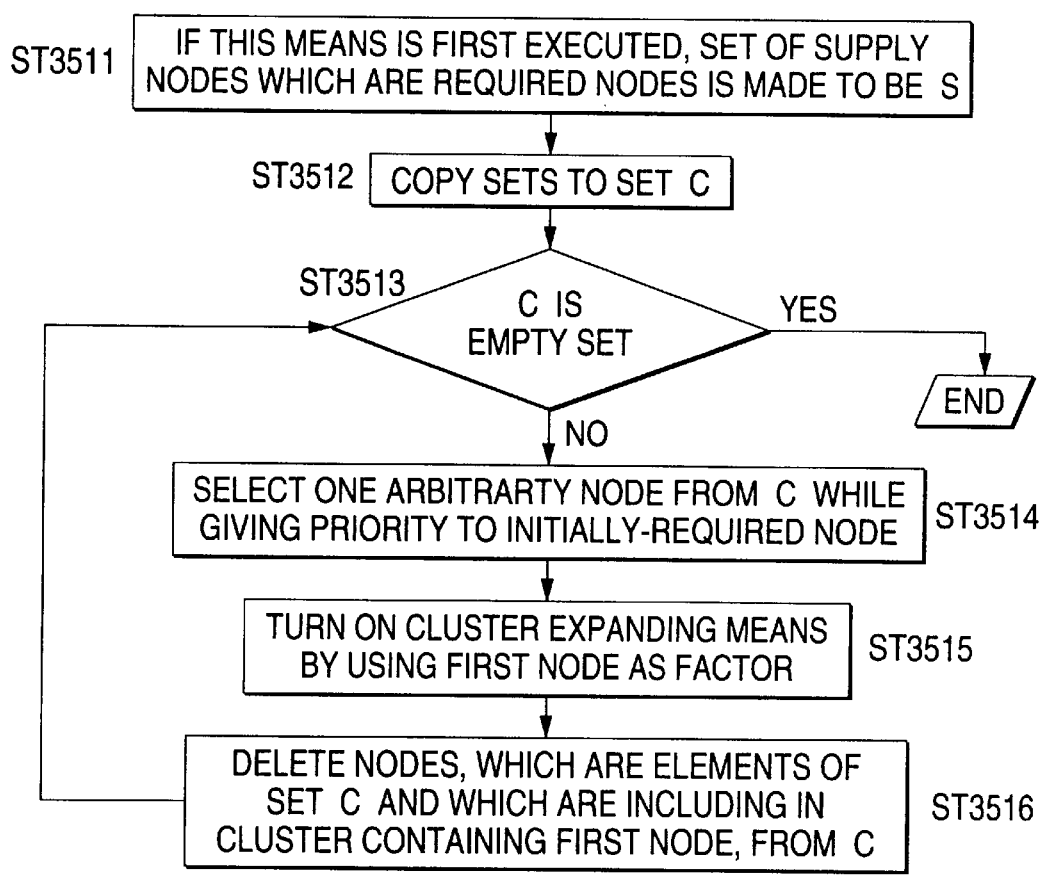
FIG. 11 is a flow chart showing an example of cluster searching means according to the third embodiment of the present invention.

The transition branch deleting means in step ST26 deletes oriented branches which are redundant when the dependency relationship among nodes. The redundant oriented branch is, for example, oriented branch E (n1, n3) in the case shown in FIG. 8. In FIG. 8, the node n2 depends on the node n3, while the node n1 depends on the node n2. To determine the dependency relationship, existence of E (n1, n2) and E (n2, n3) is sufficient. Therefore, E (n1, n3) is redundant. The redundant oriented branch can be deleted by the following method. A node which permits arrival by tracing the oriented branch from a certain node by one or more times in the inverse direction is called a arrival-permitted node of the node. When a certain node is given, tracing of the oriented branch from the node in the inverse direction enables the arrival-permitted node to be obtained. A node having a oriented branch directly extending toward a certain node is called a preceding node of the node. All of the oriented branches for directly connecting the node and the arrival-permitted nodes are redundant oriented branches. By deleting the redundant oriented branches, the redundant oriented branch when the dependency relationship among nodes can be deleted. In a case shown in FIG. 13, node n2 is the preceding node of the node n3, while node n1 is a arrival-permitted node of the node n2. Therefore, the oriented branch E (n1, n3) for connecting n3 and the arrival-permitted node n1 of n2 which is the preceding node of n3 is redundant. The dependency graph producing means produces the dependency graph shown in FIG. 11 from the initial graph shown in FIG. 10.

The process expression tree producing means in S3 will now be described. The cluster producing means in step ST35 includes a cluster searching means in step ST351 and the apex changing means in step ST352. An example of the cluster searching means in step ST351 will now be described with reference to a flow chart shown in FIG. 11. In a case where the cluster searching means is first operated in step ST3511, a set of the supply nodes each having the "required node flag" which has been turned on is indicated with symbol S and each node which is an element of S is called a cluster. In step ST3512 the set S is copied to a set C. That is, all elements of the set S are made to be all elements of the set C. If the set Column is an empty set in step ST3513, the process of the cluster searching means is ended. If C is not an empty set, the operation proceeds to step ST3514. If an initially-required node exists in C in step ST3514, one node is selected. Then, the selected node is made to be a first node. If no initially-required node exists in C, an arbitrary node is selected from C and the selected node is made to be a first node. In step ST3515 the first node is used as a factor to turn the cluster expanding means on. In step ST3516 nodes in the cluster which is an element of the set C and which includes the first node are deleted from C. In an example case shown in FIG. 6, the cluster searching means in step ST351 is as follows: the supply nodes are, in step ST2401 of the required node changing means, S1, S2, S3 and S4 among the node having the "required node flag" which has been turned on. Therefore, the cluster searching means is first turned on in step ST3511, the elements of the set S of the supply nodes, each having the required node flag" which has been turned on, are S1, S2, S3 and S4. These nodes are formed into a cluster. In step ST3512, the elements in the set C are, similarly to the set S, made to be S1, S2, S3 and S4. Since C is not an empty set in step ST3513, the operation proceeds to step ST3514. S1 and S4 in C, which are not empty sets, have been selected as initially-required nodes. Therefore, the node S1 is selected in step ST3514 and this node is made to be the first node. Then, in step ST3515 the node S1 is used as a factor to turn the cluster expanding means on. In step ST3516, the nodes in the cluster including the first node S1 which are the elements of the set C are deleted from C.

Figure 12:
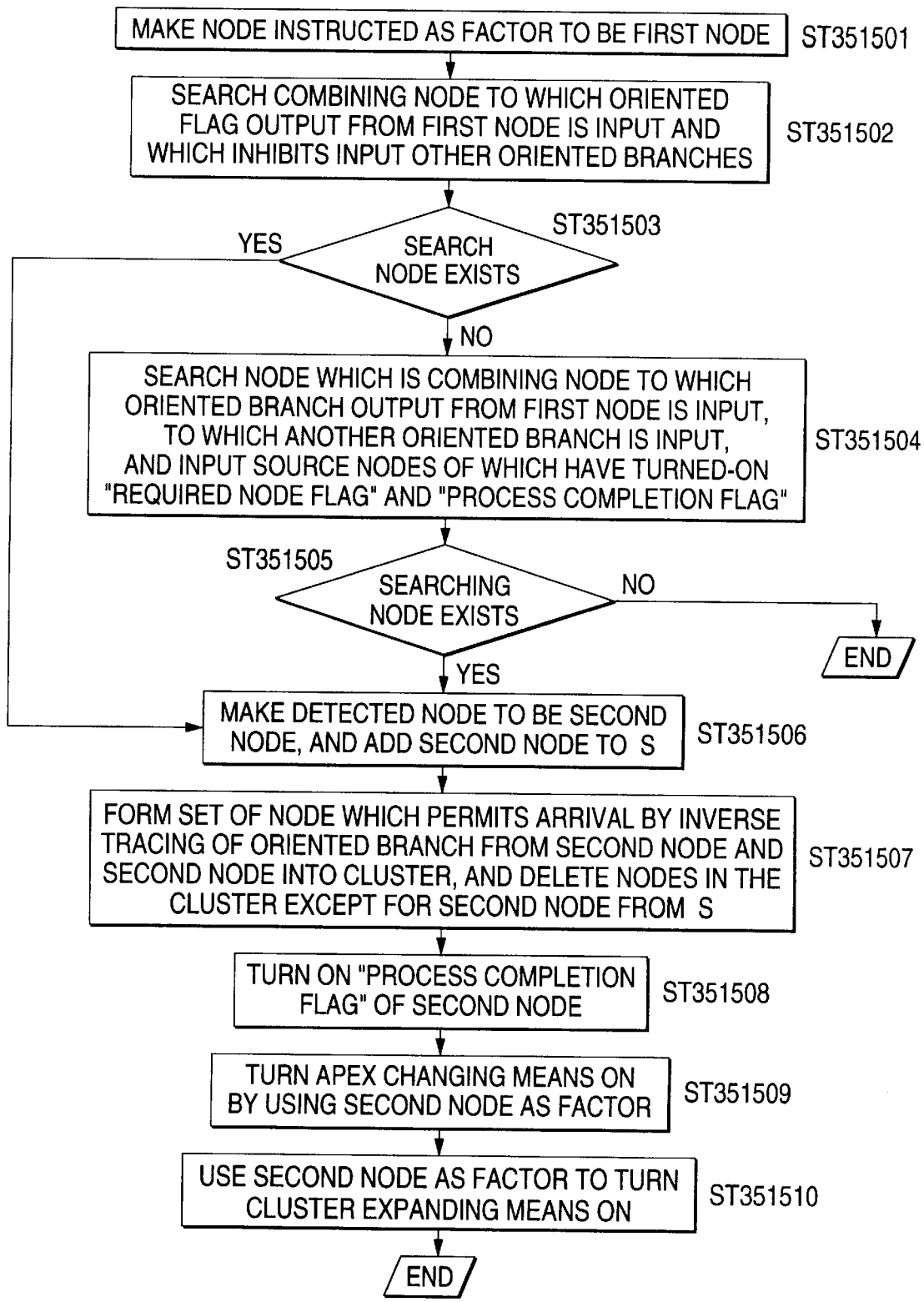
FIG. 12 is a flow chart showing a cluster expanding means according to the third embodiment of the present invention.

The cluster expanding means will now be described with reference to a flow chat shown in FIG. 12. In step ST351501 the node instructed as the factor is made to be the first node. In step ST351502 nodes to which the oriented branch output from the first node is input and to which another oriented branch is not input is detected. If the detection is successful, the operation proceeds to step ST351506 from step ST351503. If the detection is unsuccessful, the operation proceeds to step ST351504 from step ST351503. In step ST351504 detection for a node is performed to which a oriented branch output from the first node is input, to which another oriented branch is input and which has the "required node flag" and the "selection completion" flag which have been turned on. If the detection is unsuccessful, the process of the cluster expanding means is ended in step ST351505. If the detection is successful, the operation proceeds to step ST351506 from step ST351505. In step ST351506 the node detected in step ST351502 or step ST351504 is made to be a second node. Then, the second node is added as an element for the set S. In step ST351507 a set composed of the node to which arrival is permitted by the inverse movement along the oriented branch from the second node and the second node are formed into a cluster. Then, the nodes in the cluster except for the second node are deleted from S. In step ST351508 the "selection completion" flag of the second node is turned on. In step ST351509 the second node is used as a factor to turn the apex changing means on. In step ST351510 the second node is used as a factor to again turn the cluster expanding means on. When the process in step ST351510 has been completed, the process of the cluster expanding means is ended.

Figure 13:
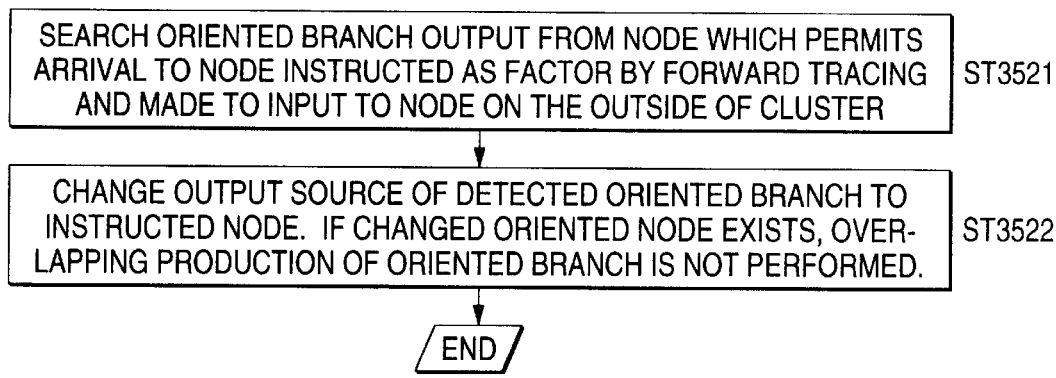
FIG. 13 is a flow chart showing an example of an apex changing means according to the third embodiment of the present invention.

An example of the apex changing means in step ST352 will now be described with reference to a flow chart shown in FIG. 13. The nodes to which arrival is permitted by inverse tracing through the oriented branch from the node instructed as a factor are arrival-permitted node of the node instructed as the factor. A oriented branch is, among the oriented branches output from the arrival-permitted node of the node instructed as the factor, detected which does not input to the node instructed as the factor and to the arrival-permitted node of the node instructed as the factor. In step ST3522 the source of the detected oriented branch is changed to the node instructed as the factor. If a changed oriented branch exists, overlapping production of the oriented branch is inhibited. Thus, the process of the apex changing means is ended.

Figure 16:
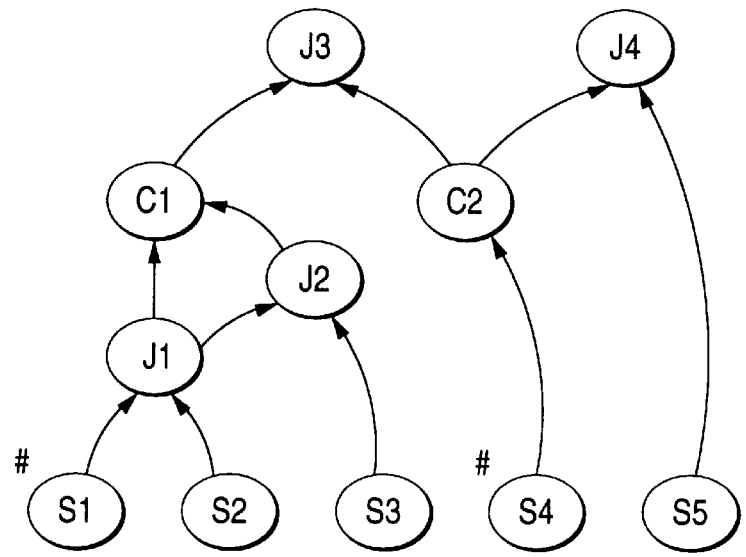
FIG. 16 is a diagram showing a result of a process performed by the cluster expanding means turned on by using node S1 as a factor according to the third embodiment of the present invention.

In an example case shown in FIG. 6, when the node S1 is instructed as the factor to turn the cluster expanding means on, in step ST351501 the node S1 is made to be a first node. In step ST351502, E (S2, J1) exists as a oriented branch which is input to the joining node J1 to which the oriented branch E (S1, J1) output from the first node S1 is input in addition to oriented branch E (S1, J1). Therefore, detection in step ST351502 is unsuccessful and the operation proceeds to step ST351504 from step ST351503. In step ST351504 the node J1 is a joining node to which the oriented branch (S1, J1) output from the first node S1 is input, the oriented branch E (S2, J1) except for E (S1, J1) is input to J1 and nodes 51 and S2, which are the input source of the node J1, have the "required node flag" and the "selection completion" flag which have been turned on. Therefore, the node J1 is searched. Since the searching node exists in step ST351505, the operation proceeds to step ST351506. In step ST351506 the detected node J1 is made to be a second node, and the second node is added to the set S. As a result, the elements of S are S1, J1, S2, S3 and S4. A set having S1 and S2, which are nodes to which arrival is permitted by inverse tracing of the oriented branch from the second node J1, and the second node J1 is formed into a cluster in step ST351507. Then, S1 and S2, which are nodes in the cluster and except for the second node J1 are deleted from the set S. As a result, the elements of S are made to be J1, S3 and S4. Instep ST351508 the "selection completion" flag of the second node J1 is turned on. In step ST351509 the second node J1 is used as a factor to turn the apex changing means on. When the apex changing means has been turned on by using the node J1 as the factor, a oriented branch, which is a oriented branch output from s1 and S1, which are arrival-permitted node of the node J1 and which is not input to the node J1 instructed as the factor and to S1 and S2 which are arrival-permitted node, is detected. As a result, E (S2, J2) is selected as the oriented branch. Instep ST3522 the output source of E (S2, J2) is changed from the node S2 to the node J1. As a result, FIG. 6 is changed to that shown in FIG. 16. In step ST351510 the second node J1 is used as a factor to turn the cluster expanding means on.

When the node J1 is instructed as the factor to turn on the cluster expanding means, the node J1 is made to be the first node in step ST351501. The joining node J2, to which the oriented branch E (J1, J2) output from the first node J1 is input has E (S3, J2) as an input oriented branch in addition to the oriented branch E (J1, J2) in step ST351502. Therefore, the detection in step ST351502 is unsuccessful and the operation proceeds to step ST351504 from step ST351503. In step ST351504 the node J2 is a joining node to which the oriented branch E (J1, J2) output from the first node J1 is input, and the oriented branch E (S3, J2) except for E (J1, J2) is input to J2 and the "required node flag" and the "selection completion" flag of J1 and J3 which are input source nodes have been turned on. Therefore, the node J2 is searched. Since the searching node exists in step ST351505, the operation proceeds to step ST351506. In step ST351506 the detected node J2 is made to be the second node and the second node is added to the set S. As a result, the elements of S are made to be J1, J2, S3 and S4. In step ST351507 a set having J1, S1, S2 and S3, which are nodes to which arrival is permitted by inverse tracing of the oriented branch from the second node J2, and the second node J2 is formed into a cluster. Then, J1 and S3, which are nodes in the cluster and which are nodes except for the second node J2 are deleted from the set S. As a result, the elements of S are made to be J2 and S4. In step ST351508 the "selection completion" flag of the second node J2 is turned on. In step ST351509 the second node J2 is used as a factor to turn on the apex changing means.

When the apex changing means has been turned on by using the node J2 as the factor, E (J1, C1) is, in step ST3521, detected as oriented branches output from J1, S1, S2 and S3, which are nodes in the cluster, and which are nodes except for the node J2 and which are input to the node outside the cluster. In step ST3522 the output source of E (J1, C1) is changed from the node J1 to the node J2. Since the oriented branch E (J2, C1) has existed at this time, overlapping production of the oriented branch is inhibited. As a result, FIG. 6 is changed to FIG. 17. In step ST351510 the second node J2 is used as a factor to turn the cluster expanding means on.

When the cluster expanding means has been turned on by instructing the node J2 as the factor, the node J2 is made to be the first node in step ST351501. In step ST351502 the joining node to which the oriented branch E (J2, C1) output from the first node J2 is detected. However, the above-mentioned node does not exist in this case. Therefore, the operation proceeds to step ST351504 from step ST351503. In step ST351504 the joining node to which the oriented branch E (J2, C1) output from the first node J2 is detected. However the foregoing node does not exist. Therefore, the process is ended. Thus, the process of the cluster expanding means using the node J1 as the factor and that of the cluster expanding means using the node S1 as the factor are ended. At this time, the nodes in the cluster searching means including the first node S1 are S1, S2, S3, J1 and J2. Among the foregoing nodes, S1, S2 and S3 which are elements of the set C are deleted in step S3516. As a result, the element of C is S4. Since C is not an empty set in step ST3513, the operation proceeds to step ST3514.

Figure 14:
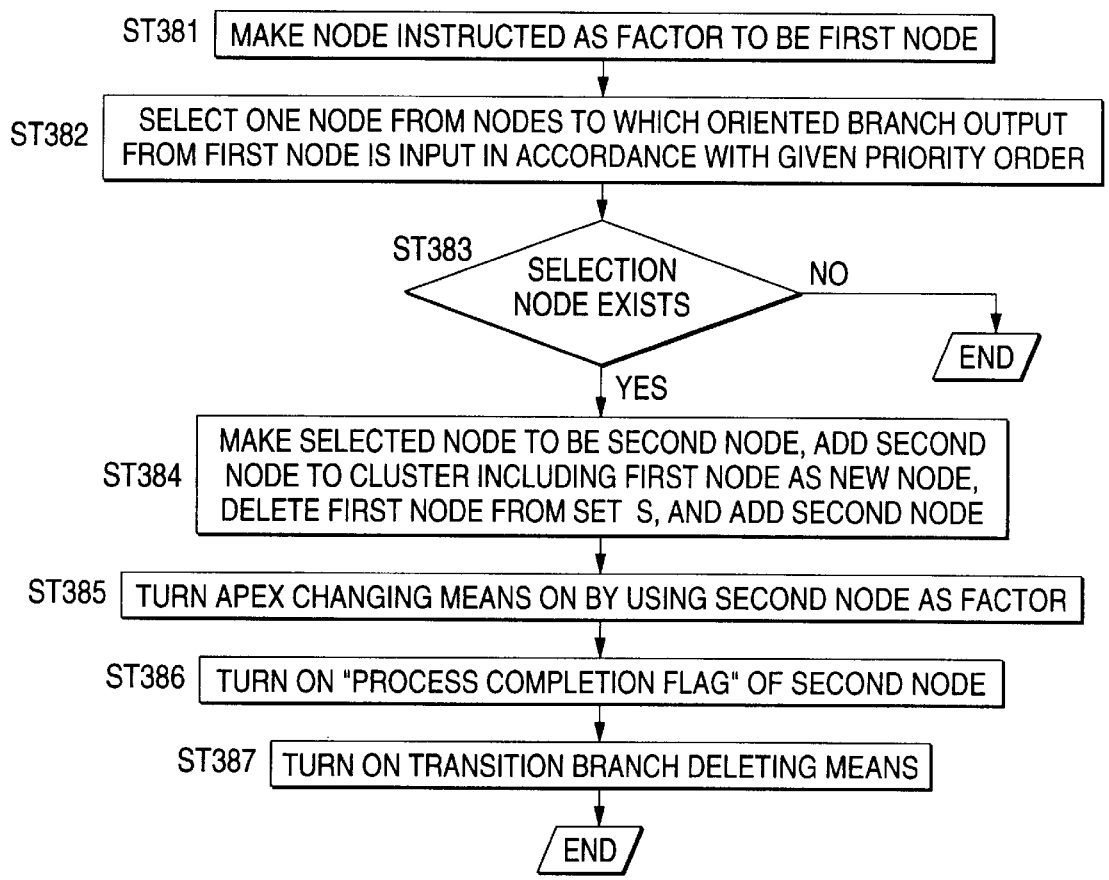
FIG. 14 is a flow chart showing a required node absorbing means according to the third embodiment of the present invention.

In step ST3514 the node S4 is selected from the set C 10 and this node is made to be the first node. In step ST3515 the first node S4 is used as the factor to turn the cluster expanding means on. Since no node exist to be searched in step ST351502 and step ST351504 in the cluster expanding means, the process is ended in step ST351505. In step ST3516 the element S4 of the set C is deleted from C as the sole node in the cluster including the first node S4. Since no element exists in C, C is made to be an empty set in step ST3513 so that the process of the cluster searching means is ended. In step ST36 the transition branch deleting means is turned on. The process of this means is similar to that in step ST26. If the total number of the cluster is one in step ST37, the operation proceeds to step ST39. If the total number of the clusters is two or more, the operation proceeds to step ST38. In step ST38 each node of the set S is used as the factor to repeatedly turn the required node absorbing means on. An example of the process, which is performed by the required node absorbing means, will now be described with reference to a flow chart shown in FIG. 14. In step ST382 one node is, in accordance with a given priority order, selected from the nodes to which the oriented branches output from the first node is input. As the priority order, the following factors are employed. The first priority order is the joining node which is not the required node and to which one oriented branch is input. The second priority order is a processing node and includes a joining node having the "required node flag" which has been turned on among nodes which permit arrival by forward tracing of the oriented branch extended from the node. When selection is performed in step ST382, a node having the first priority order is detected in accordance with the above-mentioned priority order. If it is detected, the node is selected. If the node is not detected, a node having the second priority order is detected. If the node is detected, the node is selected. If the node is not detected, a determination is performed that the node, which must be selected, does not exist. If the node having the given priority order is not selected in step ST383, the process of the required node absorbing means is ended. If the node having the given priority order is selected, the operation proceeds to step ST384. In step ST384 the node selected in step ST382 is made to be the second node and the second node added to the cluster including the first node as a new node. Then, the first node is deleted from the set S and the second node is added. In step ST385 the second node is used as the factor to turn the apex changing means on. In step ST386 the "selection completion" flag of the second node is turned on. In step ST387 the transition branch deleting means is turned on and the process of the required node absorbing means is ended. When the process of the required node absorbing means in step ST38 is ended, the cluster producing means in step ST35 is turned on. The process in step ST36 is repeated from step ST35. When the total number of the cluster is made to be one in step ST37, the operation proceeds to step ST39 so that a process of the addition node absorbing means is performed.

Figure 17:
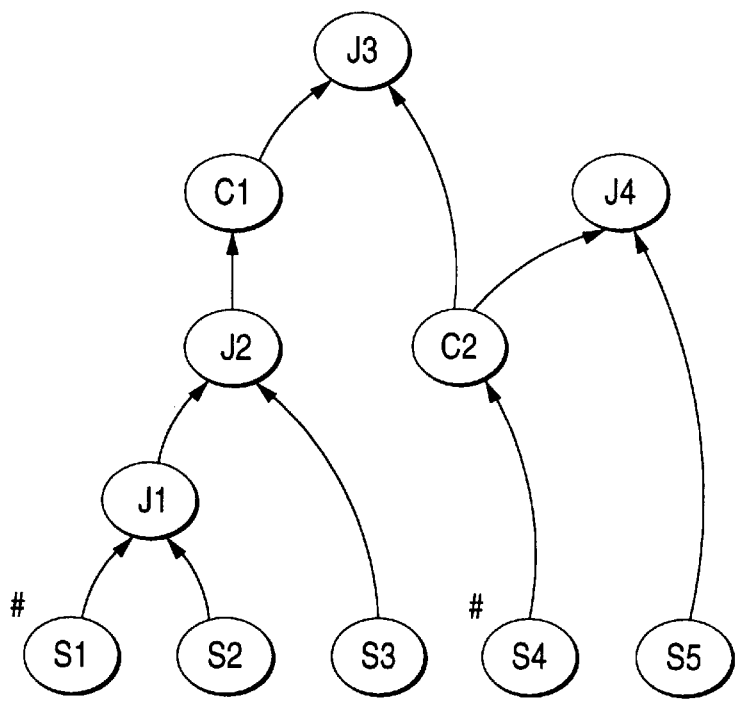
FIG. 17 is a diagram showing a result of a process performed by the cluster expanding means turned on by using node J1 as a factor according to the third embodiment of the present invention.

In FIG. 17, the element of the set S are J2 and J4. Initially, J2 is used as the factor to turn the required node absorbing means on. In step ST381 the node J2 instructed as the factor is made to be the first node. The node C1 to which the oriented branch E (J2, C1) output from the first node J2 is input in step ST382 corresponds to the second priority order. That is, C1 is a processing node and the node J3 to which arrival is permitted by forward tracing of the oriented branch from the foregoing node is the joining node having the required node flag" which has been turned on. Therefore, the node C1 is selected in step ST382. Since the node which must be selected exists in step ST383, the operation proceeds to step ST384. In step ST384 selected C1 is made to be the second node and the second node is added to the cluster including the first node as a new node. Moreover, the first node J2 is deleted from the set S composed of J2 and S4, and then the second node C1 is added. As a result, the elements of the set S are C1 and S4. In step ST385 the second node C1 is used as the factor to turn the apex changing means on. In step ST3521 of the apex changing means, a oriented branch is detected which is a oriented branch output from nodes S1, S2, S3, J1 and J2, which are arrival-permitted node of the node C1 instructed as the factor and which is not input to the node C1 instructed as the factor and which is not input to the arrival permitted node of the node C1. The oriented branch of the foregoing type does not exist. Therefore, no process is performed in step ST3522 and the process of the apex changing means is ended. In step ST386 the "selection completion" flag of the second node C1 is turned on. In step ST387 the transition branch deleting means is turned on. Since no oriented branch, which must be deleted, exists, the transition branch deleting means does not perform any process and the process of the required node absorbing means is ended.

Then, S4, which is the residual element of the set, is used as the factor to turn the required node absorbing means on. In step ST381 the node S4 instructed as the factor is made to be the first node. In step ST382 the node C2 to which the oriented branch E (S4, C2) output from the first node S4 is input corresponds to the second priority order. That is, C2 is a processing node and the node J3 to which arrival is permitted by forward tracing from the foregoing node through the oriented branch is the joining node, which is the required node. Therefore, the node C2 is selected in step ST382. Since a selective node exists in step ST383, the operation proceeds to step ST384. In step ST384 selected C2 is made to be the second node and the second node is, a new node, added to the cluster including the first node S4 and composed of only S4. Then the first node S4 is deleted from the set S composed of C1 and S4, and then the second node C2 is added. As a result, the elements of the set S are made to be C1 and C2. In step ST385 the second node C2 is used as the factor to turn the apex changing means on. In step ST3521 of the apex changing means, a oriented branch is detected which is a oriented branch output from the node S4 which is the arrival-permitted node of the node C2 instructed as the factor and which is not input to the node C2 instructed as the factor and to the S4 which is the arrival-permitted node of the node C2. The oriented branch of the foregoing type does not exist. Therefore, no process is performed in step ST3522 and the process of the apex changing means is ended. In step ST386 the "selection completion" flag of the second node C2 is turned on. In step ST387 the transition branch deleting means is turned on. Since the oriented branch which must be deleted exists, the transition branch deleting means does not perform any process. Thus, the required node absorbing means is ended.

Then, the operation proceeds to step ST35 for the cluster producing means. The cluster searching means in step ST351 is as follows: since the cluster searching means is performed at the second time, no process is performed in step ST3511. The elements of the set S are C1 and C2. In step ST3512 the elements of the set C are C1 and C2. Since C is not an empty set in step ST3513, the operation proceeds to step ST3514. No initially-required node exists in the set C. Therefore, node C1 is selected in step ST3514 and this node is made to be the first node. In step ST3515 the first node C1 is used as the factor to turn the cluster expanding means on.

Figure 18:
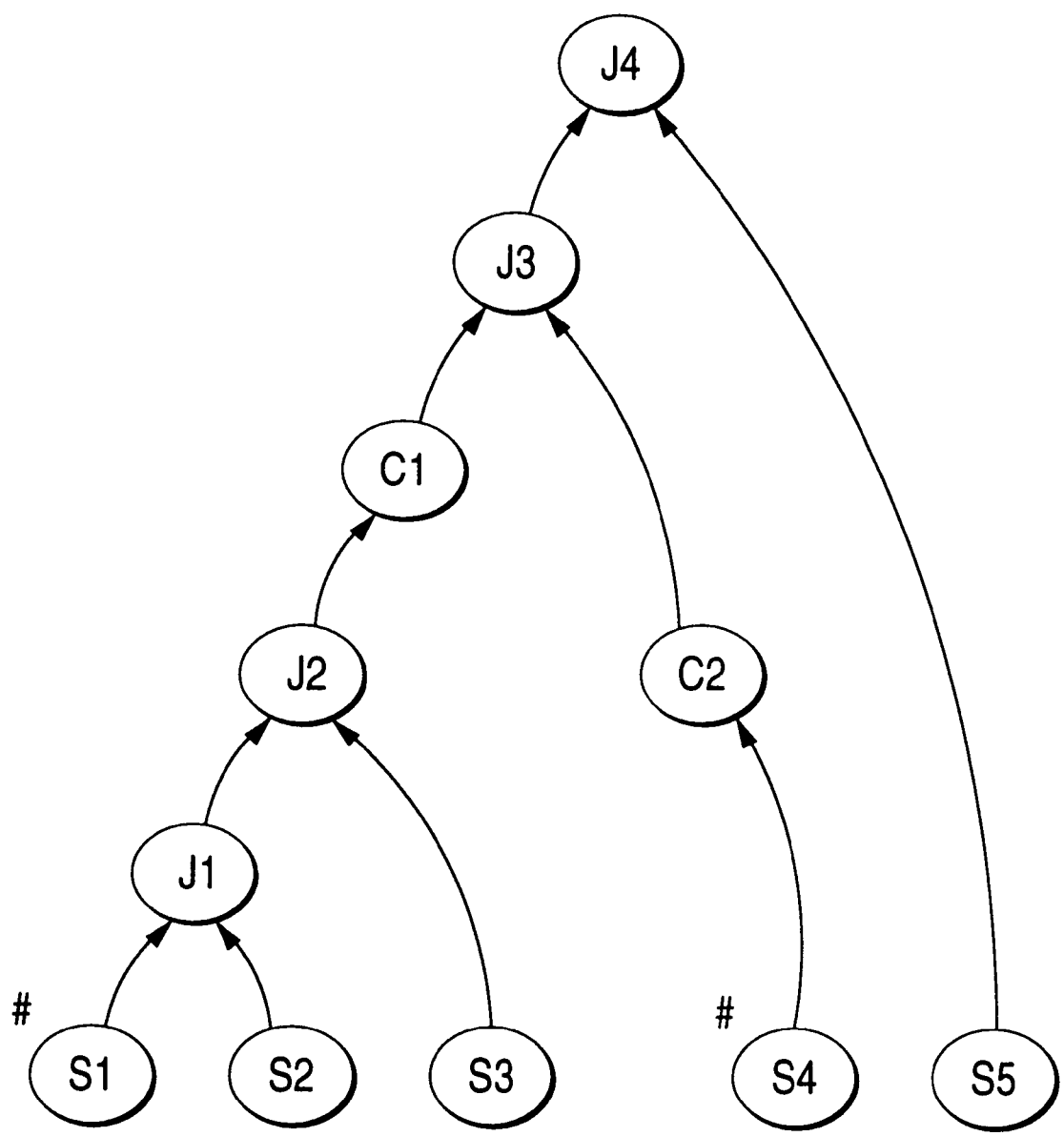
FIG. 18 is a diagram showing a result of a process performed by the cluster expanding means turned on by using node C1 as a factor according to the third embodiment of the present invention.

At this time, the step ST35 of the node is as shown in FIG. 17. The node C1 instructed as the factor in step ST351501 of the cluster expanding means is made to be the first node. In step ST351502 the oriented branch E (C2, J3) except for the oriented branch E (C1, J3) is input to the joining node J3 to which the oriented branch E (C1, J3) output from the first node C1 is input. Therefore, detection is unsuccessful and the Operation proceeds to step ST351504 from step ST351503. In step ST351504 the other oriented branch E (C2, J3) is input to the joining node J3, to which the oriented branch E (C1, J3) output from the first node C1 is input. Moreover, the required node flag" and the "selection completion" flag of each of the input source nodes C1 and C2 have been turned on. Therefore, the node J3 is searched and the operation proceeds to step ST351506 from step ST351505. In step ST351506 the detected node J3 is made to be the second node and the second node is added to S. As a result, the elements of S are made to be C1, C2 and J3. In step ST351507 a set of nodes S1, S2, S3, J1, J2, C1 and C2, which are nodes to which arrival is permitted by inverse tracing of the oriented branches from the second node J3, and the second node J3 is formed into a cluster. Then, nodes in the cluster except for the second node J3 are deleted from S. As a result, S includes only J3 as the element thereof. In step ST351508 the "selection completion" flag of the second node J3 is turned on. In step ST351509 the second node J3 is used as the factor to turn the apex changing means on. In step ST3521 of the apex changing means, the oriented branch E (C2, J4), which is the oriented branch output from the node in the cluster except for the node J3 instructed as the factor and which is input to the node on the outside of the cluster, is detected. In step ST3522 the output source of the detected oriented branch E (C2, J4) is changed from the node C2 to the node J3 instructed as the factor and the process of the apex changing means is ended. A result of the foregoing process is shown in FIG. 18. In step ST351510 the second node J3 is used as the factor to turn on the cluster expanding means. Since the node which must be detected exists in step ST351502 and step ST351504 of the cluster expanding means, the process of the cluster expanding means is ended in step ST351505. As a result, step ST3515 of the cluster searching means is ended. At this time, the set C includes C1 and C2 as the elements thereof. In step ST3516 C1 and C2 which are elements of the set C and which are nodes in the cluster including the first node C1 are deleted. As a result, no element exists in the set C and C is an empty set in step ST3513. Therefore, the process which is performed by the cluster searching means is ended. Therefore, step ST35 of the cluster producing means of the process expression tree producing means is ended. In step ST36 the transition branch deleting means is turned on. Since no redundant branch exists here, no process is performed. Since the total number of the clusters is one in step ST37, the operation proceeds to step ST39. In step ST39 the node at the apex to which the oriented branches of the clusters are concentrated is used as the factor to repeatedly turn the additional node absorbing means on.

Figure 15:
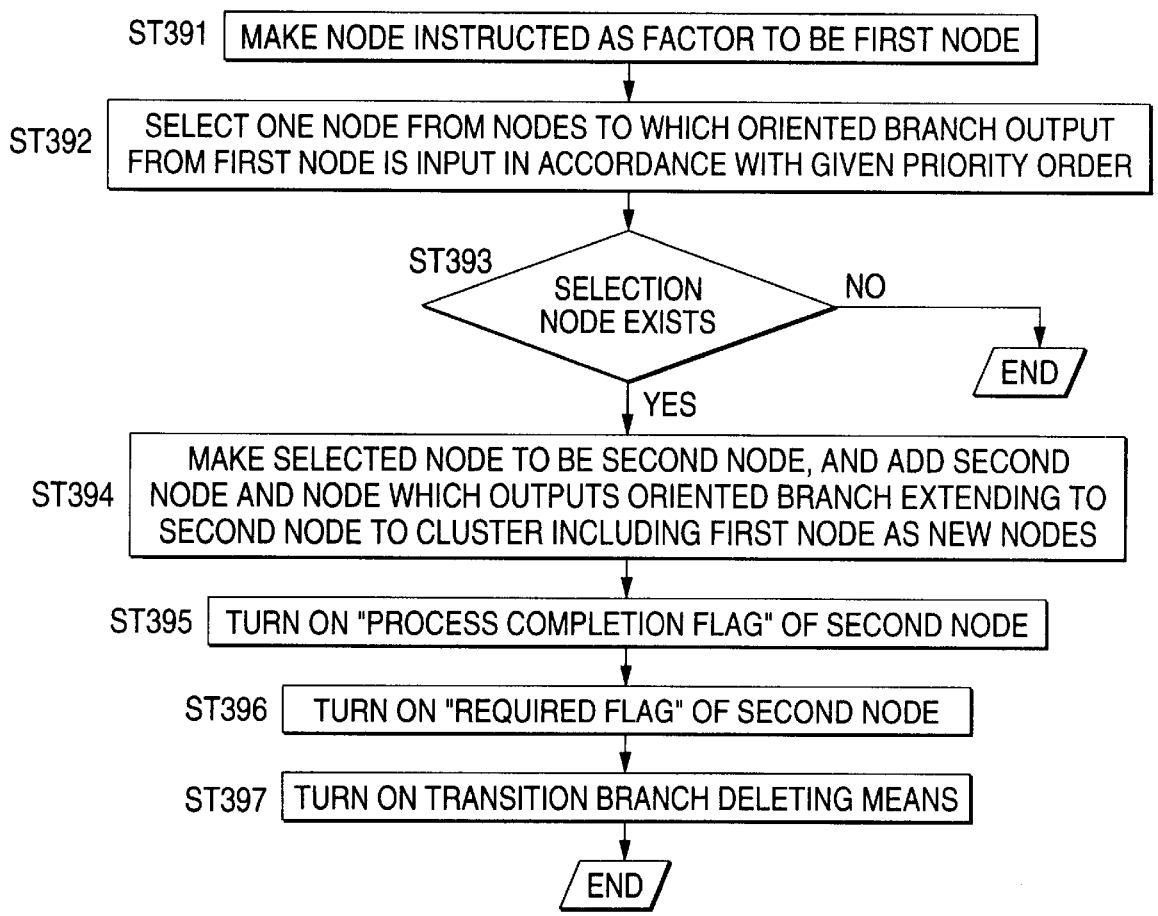
FIG. 15 is a flow chart showing an example of an additional node absorbing means according to the third embodiment of the present invention.

An example of the additional node absorbing means in step ST39 will now be described with reference to a flow chart shown in FIG. 15. In step ST391 the node instructed as the factor is made to be the first node. In step ST392 one node is selected from the nodes to which the oriented branches output from the first node are input in accordance with the given priority order. In this case, the given priority order is as follows: the first priority order is the joining node to which one oriented branch is input. The second priority order is another node. When the selection is performed in step ST392, the node having the first priority order is detected in accordance with the above-mentioned priority order. If the node is detected, the node is selected. If the node is not detected, the node having the second priority order is detected. If the node is detected, the node is selected. If the node is not detected, a determination is made that the node does not exist. If the node having the given priority order is not selected in step ST393, the process of the required node absorbing means is ended. If the node having the given priority order is selected, the operation proceeds to step ST394. In step ST394 the node selected in step ST392 is made to be the second node. Then, the second node and the node from which a oriented branch is output toward the second node are, as new nodes, added to the cluster including the first node. Then, the second node is used as the factor to turn the apex changing means on. In step ST395 the "selection completion" flag of the second node is turned on. In step ST396 the "required node flag" of the second node is turned on. In step ST397 the transition branch deleting means is turned on and the process which is performed by the additional node absorbing means is ended.

When all nodes have been absorbed into one cluster in step ST39, the operation proceeds to step ST40. In the step ST39 shown in FIG. 18, J3 which is the node at the apex to which the oriented branches of the cluster are concentrated is used as the factor to turn the additional node absorbing means. In step ST391 of the additional node absorbing means, the node J3 instructed as the factor is made to be the first node. In step ST392 only one oriented branch E (J3, J4) is output from the first node J3, the oriented branch being input to the node J4. Since a selection node exists in step ST393, the operation proceeds to step ST394. In step ST394 the selected node is made to be the second node. Moreover, the second node J4 and the node S5 for outputting a oriented branch toward the second node are, as new nodes, added to the cluster including the first node J3. Then, the second node J4 is used as the factor to turn the apex changing means on. In step ST3521 of the apex changing means, no oriented branch exists which is output from the node to which arrival is permit by forward tracing of the oriented branch to the node J4 instructed as the factor and which is input to a node on the outside of the cluster. Therefore, no process is performed in step ST3522 and the process of the apex changing means is ended. In step ST395 the selection completion" flag of the second node J4 is turned on. In step ST397 the transition branch deleting means is turned on. Since no redundant oriented branch exists in FIG. 18, the transition branch deleting means does not perform any process and the process of the transition branch deleting means is ended. Since all nodes have been absorbed into one cluster as a result of the above-mentioned operation, the operation proceeds to step ST40. In step ST40 a oriented branch is produced from the node at the apex to which the oriented branches in the cluster are concentrated toward the node in the end process so that the process of the process expression tree producing means is ended. In the structure shown FIG. 18, a oriented branch is produced from the node J4 at the apex to which the oriented branches of the cluster are concentrated toward the node V1 in the end process and thus the process of the process expression tree producing means is ended. As a result, a final process expression tree shown in FIG. 12 can be produced.

The article manufacturing procedure determining means according to the present invention is formed such that when an element process is given, node connection means produces an initial graph, initially-required node selection means selects required nodes, initial graph producing means produces an initial graph corresponding to each element process and composed of nodes and oriented branches, dependency graph producing means deforms the initial graph to produce a dependency graph and process expression tree producing means deforms the dependency graph to produce a process expression tree for expressing a manufacturing procedure which can be executed. Therefore, the necessity of forming possible joints of the element processes and performing simulations of the formed joints on the computer can be eliminated.

Fourth Embodiment

Examples of the information sources of the supply nodes S1, S2, S3, S4 and S5 according to the fourth structure of the present invention are shown in FIGS. 42, 43, 44, 45 and 46. An assumption is made that information of an event satisfying that the "day" of the event is June and the "Coefficient of Number of Audience" is 0.5 or more is obtained. Although the operation is the same as that according to the first embodiment except for step ST11 in which the following process is performed. Information of "Day" is acquired from node S1, while "Coefficient of Number of Audience" is acquired from node S4. Therefore, the initially-required node selection means in ST11 selects node S1 and node S4 as initially-required node. The data unifying procedure determining means according to the present invention is formed such that when an element process is given, the node connection means produces the initial graph, the initially-required node selection means selects a required node, the initial graph producing means uses nodes corresponding to the element processes and oriented branches to produce the initial graph, the dependency graph producing means deforms the initial graph to produce a dependency graph and the process expression tree producing procedure deforms the dependency graph so that a process expression tree expressing a data unifying procedure, which can be performed, is produced. Therefore, the necessity of forming all of joints for the element processes and performing simulations of the formed joints on a computer can be eliminated.

Fifth Embodiment

Figure 19:
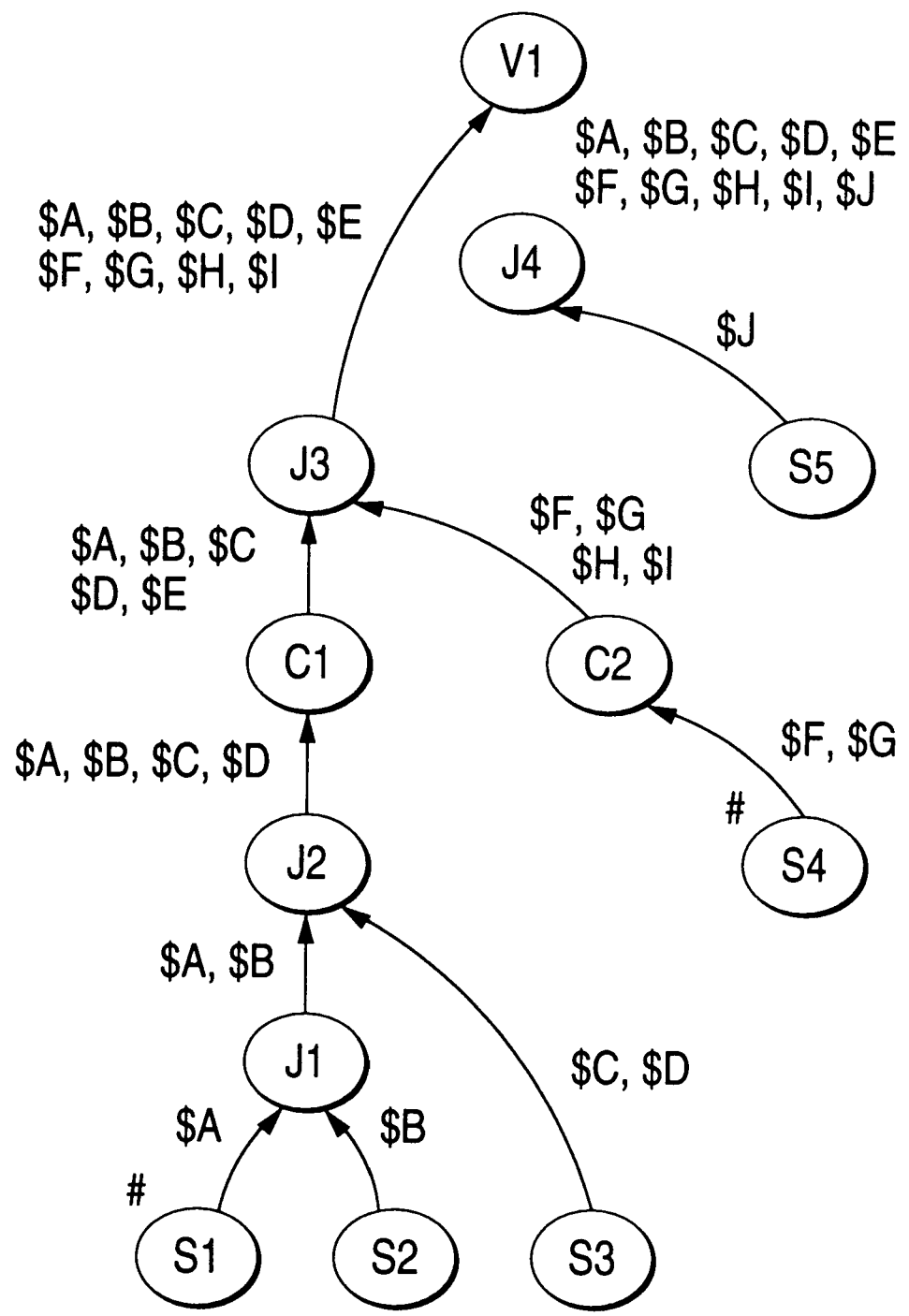
FIG. 19 is a diagram showing a process expression tree formed by the process shown in FIG. 41 according to a fifth embodiment of the present invention.

If additional information is required in addition to required information, a process similar to the fourth embodiment is performed. If only required information is requested, the processing node changing means does not perform any process in step ST25. When step ST37 has been ended, a graph shown in FIG. 18 can be obtained. In this graph, one cluster exists. The cluster is composed of nodes S1, S2, S3, S4, J1, J2, C1 and C2 in which J3 is at the apex. The additional node absorbing means in step ST39 does not perform any process. The final node absorbing means in step ST40 produces a oriented branch from the node J3 at the apex of the tree step ST39 of the sole cluster toward the node V1 corresponding to the end process. Moreover, the oriented branch E (J3, J4) which is the oriented branch except for the oriented branch extending from the node J3 at the apex of the tree structure of the sole cluster toward node V1 corresponding to the end process is deleted. As a result, a process expression tree shown in FIG. 19 can be produced. When the process is performed in accordance with the process expression tree, a table shown in FIG. 53 is output from the node J3. The output table is input to the node V1. The data unifying procedure determining means according to the present invention is formed such that when additional information is instructed to be required in addition to required information, processing node changing means and additional node absorbing means do not perform any process, final node absorbing means produces a oriented branch extending from the apex of a tree structure of a—sole cluster toward a node corresponding to the end process and deletes oriented branches except the oriented branch extending from the node at the apex of the tree structure of the sole cluster toward the node corresponding to the end process. Therefore, a process expression tree which does not include unnecessary process for obtaining additional information can be produced.

Sixth Embodiment

Sixth and seventh embodiments of the present invention will now be described. When data relating to data satisfying a certain retrieval condition is collected from a plurality of data bases in a largest possible quantity, outer join is required when tables are joined. The outer join operation is, differently from a usual joining method, that is, inner join operation, arranged such that two tables are joined in such a manner that the rows of a table which is preserved, are retained as rows of a result of joint even if the table, which is not retained, does not have a row which matches the row of the table which is retained. At this time, the value of the column of the result of the joint corresponding to the column of the table which is not retained is made to be blank. In an example case shown in FIG. 20, when table N and table Y are inner-joined by using the staff numbers as keys, a table shown in (c) can be obtained. When outer join is performed while retaining information of table N, table shown in (d) can be obtained. In this case, information of the years of employment corresponding to the staff numbers of Jiro Tanaka and Taro Yamada does not exist in table Y. Therefore, all of information items of Jiro Tanaka and Taro Yamada are lost with the inner join. However, the information items are retained with the outer join. At this time, the field for the year of employment is made to be blank. As shown in the foregoing example, outer join is required to maximally use obtainable information. In the process expression tree shown in FIG. 7 produced in the second embodiment, nodes S1, J1, J2, C1, J3, C2 and S4 exist on the connection path for connecting the initially-required nodes on an assumption that the initially-required nodes are S1 and S4. Therefore, all nodes to which arrival is permitted by forward tracing of the oriented branch from the node on the connection path for connecting the initially-required nodes are J1, J2, C1, J3, C2, J4 and V1. On the other hand, all nodes to which arrival is permitted by inverse tracing of the oriented branch from the node on the connection path for connecting the initially-required nodes are S1, S2, S3, J1, J2, C1, C2 and S4. Therefore, the required nodes are all nodes S1, S2, S3, S4, J1, J2, J3, J4, C1, C2 and V1 except for S5. Therefore, the table output from the node S5 is the additional table, while the tables output from the other nodes are required tables. Since two required tables are input to the joining node J1, inner join is performed. Since the required table is input from the node J3 to the joining node J4 and the additional table is input to the same from the node S5, the table input from the node J3 is retained and outer join is performed.

When the table which is the output from the node S5 and which is shown in FIG. 46 and the table which is the output from the node J3 and which is shown in FIG. 53 are joined with each other, inner join and outer join, in which the table shown in FIG. 53 is retained, cause the same result of joint being obtained in the form of the table shown in FIG. 54. That is, the same result is obtained. However, if the output from the node S5 is the table shown in FIG. 21, inner join, which is performed such that the foregoing table and the table shown in FIG. 53 are joined such that the column of the "correction of sales" and the column of "correction of profit" are subjected to a comparison, results in no rows which can be joined with each other. As a result, all information items are lost. However, outer join, in which information in the table shown in FIG. 53, enables the table shown in FIG. 22 to be obtained. The data unifying procedure determining means according to the present invention is arranged such that out join is performed for the joining node to which one required table and one additional table are input and inner join is performed for the joining node to which two required tables are input.

Seventh Embodiment

Figures 21, 22, 23, 24:
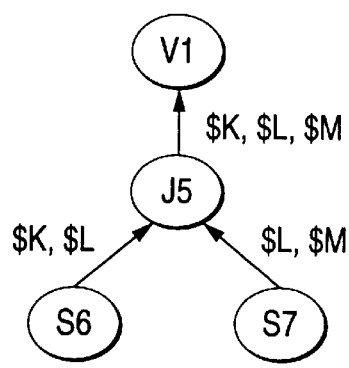
FIG. 21 is a diagram showing an example of an output table from node S5 according to the sixth embodiment of the present invention.
FIG. 22 is a diagram showing an example of a process expression tree according to the sixth embodiment of the present invention.
FIG. 23 is a diagram showing an information source for supplying information of node S6 according to a seventh embodiment of the present invention.
FIG. 24 is a diagram showing an information source for supplying information of node S7 according to a seventh embodiment of the present invention.

An embodiment having an eighth structure of the present invention will now be described. In the process expression tree shown in FIG. 22, the contents of the information sources of the nodes S6 and S7 are respectively shown in FIGS. 23 and 24. An assumption is made that a retrieval condition that the "Part Number" starts with T. In this case, since the "Part Number" starts with T for all of the rows of the table shown in FIG. 23, the node S6 as it is outputs the table. As for the node S7, only the rows in which the "Part Number" starts with T are extracted from the table shown in FIG. 24 that the table shown in FIG. 25 is output. When the tables respectively shown in FIGS. 23 and 25 are inner-joined at the node J5, a table shown in FIG. 27 can be obtained. Thus, information of the products having the "Part Numbers" T52 and T32 is lost. If the table shown in FIG. 23 is retained and outer-joined with the table shown in FIG. 25 at the node J5, a table shown in FIG. 28 can be obtained. In this case, information about the product having the "Part Number" T32 is lost. If the table shown in FIG. 25 is, at the node JS, retained and outer-joined with the table shown in FIG. 23, a table shown in FIG. 29 can be obtained. In this case, information about the product having the "Part Number" T52 is lost.

In the present invention, the retrieval condition is instructed such that the "Part Number" starts with T. The columns of the "Part Number" having the retrieval conditions are output from the supply nodes S6 and S7. Therefore, the nodes S6 and S7 are initially-required nodes. In the process expression tree shown in FIG. 22, the connection paths for connecting the initially-required nodes are nodes S6, J5 and S7. Therefore, all nodes S6, S7, J5 and V1 are required nodes. Thus, all tables output from the nodes S6 and the node S7 are required tables. Since two required tables are input to the joining node J5 and the retrieval conditions are given to only the columns of the "Part Number" which are compared for the joint, full outer join is performed at node J5. Full outer join is, differently from the usual joint method, that is, inner join, arranged such that two tables are joined in such a manner that even if a row matching the row of a table does not exist in another table, the row is retained as a result of the joint. At this time, the value of the column having no contents is made to be blank.

For example, referring to FIG. 20, when outer join of table N and table Y is performed by using the staff number as the key, a table shown in (c) is obtained. In this case, information of years of employ corresponding to the staff numbers of Jiro Tanaka and Taro Yamada does not exist in the table Y. Moreover, information corresponding to name of a staff having the staff number of 444 does not exist in the table N. As described above, full outer join is required to maximally use obtainable information. When full outer join is performed at the node J5, a table shown in FIG. 26 can be obtained. Thus, information of all products having the "Part Number" which starts with T can be obtained. The data unifying procedure determining means according to the present invention is arranged such that the initially-required node selection means makes the supply node for output a table containing a column having a retrieval condition to be the initially-required node, and outer join is performed at the joining node to which one required table and one additional table are input by retaining the required table, full outer join is performed at the joining node to which two required tables are input and which has the joining node having the columns to be compared for the joint and having retrieving condition, and inner join is performed at the joining node to which two required tables are input.

Eighth Embodiment

Figure 30:
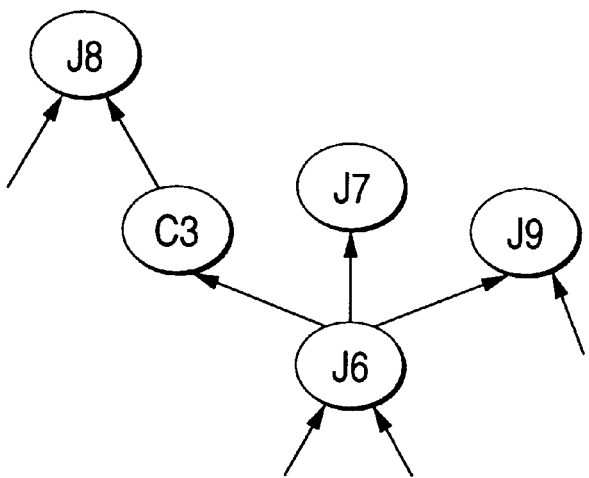
FIG. 30 is a diagram showing a subject which must be processed by the required node absorbing means according to an eighth embodiment of the present invention.

An embodiment having a ninth structure according to the present invention will now be described. In step ST382 of the required node absorbing means shown in FIG. 14, an assumption is made that the node J6 shown in FIG. 30 is a first node, the required node flag" of the node J8 has been turned on and the required node flag" of each of the nodes C3, J7 and J9 has not been turned on. Since the node J7 has the "required node flag" which has not been turned on and the node J7 is a joining node to which one oriented branch is input, the node J7 has the first priority order. Since the node C3 is a processing node and nodes which permits arrival by forward tracing of the oriented branch from the node C3 include the joining node J8 having the "required node flag" which has been turned on, the node C3 has the second priority order. Therefore, the node J7 is selected in this case. The joining node to which one oriented branch is input has an effect to reducing the number of rows as is experienced with conversion of the table shown in FIG. 36 into the table shown in FIG. 39 by selecting the rows of the table in accordance with the instructed condition. When a node which is a processing node and which has the joining node having the "required node flag" which has been turned on among the nodes which permit arrival by forward tracing of the oriented branch from the node is processed soon as possible, the joining node having the "required node flag" which has been turned can be processed quickly. Since the tables are joined by the joining node having the "required node flag" which has been turned on, the possibility of reducing the number of the rows is raised. The data unifying procedure determining means according to the present invention is arranged such that when the required node absorbing means searches one node from all nodes to which oriented branches output from the node instructed as the factor are input, the first priority order is given to the joining node which has the "required node flag", which has not been turned on and to which one oriented branch is input. The second priority order is given to the node, which is a processing node and which has a joining node having a "required node flag" which has been turned on among the nodes which permit arrival by forward tracing of the oriented branches from the node. Therefore, the row which must quickly be processed in the data unifying procedure can be deleted and thus the quantity of data can be reduced.

Ninth Embodiment

Figure 31:
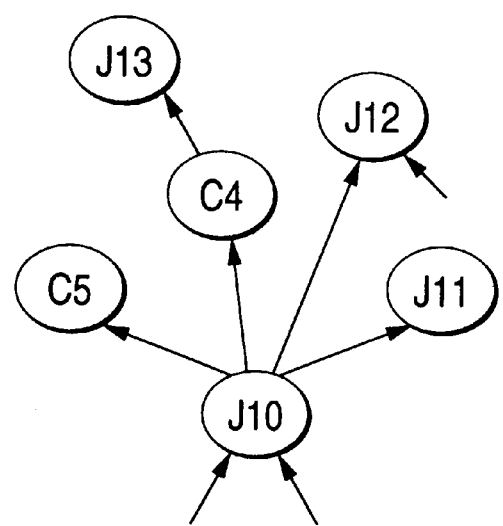
FIG. 31 is a diagram showing a subject which must be processed by the additional node absorbing means according to the eighth embodiment of the present invention.
Figure 32:
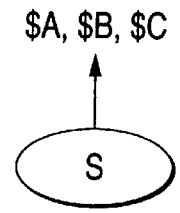
FIG. 32 is a diagram showing a supply process which is an element process of a conventional manufacturing procedure determining means.
Figure 33A:
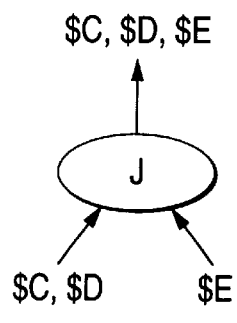
FIGS. 33A and 33B are diagrams showing a joining process which is an element process of the conventional manufacturing procedure determining means.
Figure 33B:
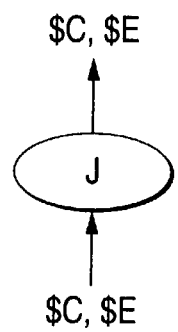
Figure 34:
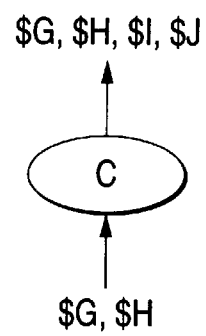
FIG. 34 is a diagram showing a processing process which is an element process of the conventional manufacturing procedure determining means.
Figure 35:
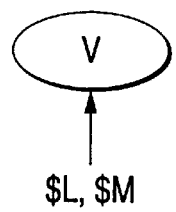
FIG. 35 is a diagram showing an end process which is an element process of the conventional manufacturing procedure determining means.

An embodiment having a tenth structure of the present invention will now be described. In step ST392 of the additional node absorbing means shown in FIG. 25, an assumption is made that the node J10 shown in FIG. S8 is the first node. Since the node J11 is a joining node to which one oriented branch is input, the node J11 has the first priority order. Nodes J12, C4 and CS which are nodes among all nodes to which the oriented branches output from the node J10 are input and which are nodes except for the node J11 have the second priority order. Therefore, the node J11 is selected in this case. The joining node to which one oriented branch is input has an effect of reducing the number of rows as is experienced with conversion of the table shown in FIG. 15 into the table shown in FIG. 31 by selecting the rows of the table in accordance with the instructed condition. The data unifying procedure determining means according to the present invention has the additional node absorbing means which searches one node among all nodes to which oriented branches output from the node instructed as the factor are input in accordance with the given priority order such that the first priority order is given to the joining node to which one oriented branch is input and the second priority order is given to the other node. Therefore, the rows which must be processed quickly in the data unifying procedure can be deleted and thus the quantity of data can be reduced.

According to the first to third structures of the present invention, when an element process is given, node connection means produces an initial graph, the initially-required node selection means selects required nodes, the initial graph producing means produces an initial graph corresponding to each element process and composed of nodes and oriented branches, the dependency graph producing means deforms the initial graph to produce a dependency graph and the process expression tree producing means deforms the dependency graph to produce a process expression tree for expressing a manufacturing procedure which can be executed. Therefore, the necessity of forming all possible joint of the element processes and performing simulations of the formed joints on the computer can be eliminated. Thus, an effect can be obtained in that the process expression tree can be produced in a short time.

According to the second and fourth structures of the present invention, when an element process is given, the node connection means produces an initial graph, the initially-required node selection means selects required nodes, the initial graph producing means produces an initial graph corresponding to each element process and composed of nodes and oriented branches, the dependency graph producing means deforms the initial graph to produce a dependency graph and the process expression tree producing means deforms the dependency graph to produce a process expression tree for expressing a data unifying procedure which can be executed. Therefore, the necessity of forming all possible joint of the element processes and performing simulations of the formed joints on the computer can be eliminated. Thus, an effect can be obtained in that the process expression tree can be produced in a short time.

According to the fifth structure of the present invention, when additional information is instructed to be required in addition to required information, the processing node changing means and the additional node absorbing means do not perform any process, the final node absorbing means produces a oriented branch extending from the apex of a tree structure of a sole cluster toward a node corresponding to the end process and deletes oriented branches except the oriented branch extending from the node at the apex of the tree structure of the sole cluster toward the node corresponding to the end process. Therefore, a process expression tree including unnecessary process for obtaining additional information can be produced and thus an effect can be obtained in that the process expression tree can be produced in a short time.

According to the sixth and seventh structures of the present invention, outer join is performed at the joining node to which one required table and one additional table are input while retaining the required table, and inner join is performed at the joining node to which two required tables are input. Therefore, an effect can be obtained in that a process expression tree can be produced which is capable of obtaining additional information without loosing required information.

According to the eighth structure of the present invention, the initially-required node selection means makes the supply node for outputting a table including a column having a retrieval condition to be an initially-required node, and out join is performed at the joining node to which one required table and one additional table are input, full outer join is performed at the joining node to which two required tables are input and which has columns to be compared for the joint and to which retrieval condition is given and inner join is performed at the other joining nodes to which two required tables are input. Therefore, an effect can be obtained in that a process expression tree can be produced which is capable of obtaining additional information without loosing of required information which satisfies the retrieval condition.

According to the ninth structure of the present invention, when the required node absorbing means searches one node among all nodes to which the oriented branches output from the node instructed as the factor are input in accordance with the given priority order, the first priority is given to the joining node which has the "required node flag" which has not been turned on and to which one oriented branch is input. The second priority order is given to a processing node which has a joining node which has the "required node flag" which has been turned on among the nodes which permit arrival by forward tracing of the oriented branches from the node. Therefore, an effect can be obtained in that the rows which must be quickly be processed in the data unifying procedure can be deleted, the quantity of data can be reduced, the data storage region can be reduced and thus the time required to complete the process can be shortened.

According to the tenth structure of the present invention, when the additional node absorbing means searches one node among all nodes to which oriented branches output from the node instructed as the factor are input in accordance with the given priority order, the first priority is given to the joining node to which one oriented branch is input and the second priority is given to the other node. Therefore, an effect can be obtained in that the rows which must be processed quickly in the data unifying procedure can be deleted, the quantity of data can be reduced, the data storage region can be reduced and thus the time required to complete the process can be shortened.

What is claimed is:

1. Article manufacturing procedure determining system comprising:

initial graph producing means including
    node connection means for producing an initial graph corresponding to each element process and composed of nodes and oriented branches, and
    initially-required node selection means for selecting required nodes;
  dependency graph producing means for deconstructing the initial graph to produce a dependency graph by producing the oriented branch for a processing node from a joining node required to form all parts input to the processing node into one set before a process in the processing node is performed and by deleting the oriented branches that are unnecessary for expressing an execution order relationship among nodes and process expression tree producing means deconstructs the dependency graph to produce a process expression tree for expressing a manufacturing procedure which can be executed.

2. The article manufacturing procedure determining system of claim 1 comprising:

said node connection means,
  when a plurality of element processes including one end process and at least one or more supply processes are given which are classified into any one of a supply process for outputting one or more parts formed into a set, a joining process for outputting parts formed into one set by joining two or more parts divided into two sets and supplied as an input or processing one or more parts formed into one set and supplied as an input, a processing process in which one or more parts supplied as an input and formed into one set are processed to produce one or more new parts and in which the parts supplied as the input and formed into one set and the newly made parts are output as parts formed into one set and an end process for producing a final result on the basis of one or more parts formed into one set and supplied as an input and in a case where one node is made to correspond to each element process and a part output from a certain element process is input to another element process,
  produces a oriented branch for each of the nodes except for a node corresponding to the end process from a node corresponding to the element process for outputting the part to a node corresponding to an element process to which the part is input so as to produce an initial graph composed of nodes and oriented branches,
  said initially-required-node selection means outputs a necessary part which is necessary in the end process and selecting a node corresponding to the supply process or the processing process as an initially-required node,
  said initial graph producing means produces an initial graph by turning said initially-required node selection means and said node connection means on,
  said dependency graph producing means produces a dependency graph by producing a oriented branch for a processing node from a joining node required to form all of the parts input to the processing node into one set before a process in the processing node is performed and by deleting oriented branches unnecessary for expressing execution order relationship among nodes, and
  said process expressing tree producing means produces a process expressing tree by deconstructing the made dependency graph to change the oriented branch to cause one oriented branch to be output from each node and cause single oriented branch to be input to the processing node while preventing change in the execution order relationship among the nodes so as to express the manufacturing process which can be performed.

3. The article manufacturing procedure determining system of claim 1, wherein said node connection means,
  when a plurality of element processes including one end process and at least one or more supply processes are given which are classified into any one of a supply process for outputting one or more parts formed into one set, a joining process for joining two or more parts supplied as an input and divided into two sets to output parts formed into one set or processing one or more parts supplied as an input and formed into one set, a processing process for processing one or more parts supplied as an input and formed into one set to produce one or more new parts and outputting the parts supplied as the input and formed into one set and the newly made parts as parts formed into one set and an end process for producing a final result on the basis of one or more parts supplied as an input and formed into one set and in a case where one node is made to correspond to each element process and a part output from a certain element process is input to another element process, produces an oriented branch for each of the nodes except for a node corresponding to the end process from a node corresponding to the element process for outputting the part to a node corresponding to an element process to which the part is input so as to produce an initial graph composed of nodes and oriented branches,
  said initially-required-node selection means outputs a necessary part which is necessary in the end process and selecting a node corresponding to the supply process or the processing process as an initially-required node,
  said initial graph producing means turns said initially-required node selection means and said node connection means on,
  said dependency graph producing means is structured such that connection pass searching means including all of required nodes and arranged to connect the required nodes through oriented branches and other nodes and to search a connection path having no loop is turned on, then respective nodes on the connection paths searched by said required node connection path searching means are sequentially selected, required node changing means is turned on for each of the selected node by using the node as a factor, said required node changing means makes the node supplied as the factor to be a first node, turns on a "required node flag" indicating that the first node is necessary, if the first node is a node except for a processing node, then said required node changing means is turned on by using each node for outputting an oriented branch toward the first node as a factor, if the first node is a processing node, a connection path for connecting respective nodes for outputting the oriented branches to the first node is obtained and said required node changing means is turned on by using all of nodes on the connection path as factors to make an oriented branch extending from each joining node on the connection path to be the first node and delete the oriented branch oriented from each supply node on the connection path toward the first node, when the process of said required node changing means has been completed, then processing node changing means is turned on for each processing node except for the required node by using the node as a factor, said processing node changing means makes the node supplied as the factor to be a first node, if a "process completion flag" of the first node is turned on, the process ends, if the same is not turned on, and if the first node is a supply node or a joining node, said required node changing means are sequentially turned on by using each node for outputting the oriented branch toward the first node as a factor, if the first node is a processing node, connection paths for connecting all nodes for outputting oriented branches toward the first node are searched to sequentially select each of the searched nodes one by one, the selected node is made to be a second node, said processing node changing means is turned on for the second node, if the second node is a joining node, an oriented branch extending from the second node to the first node is made, if the second node is a supply node, the oriented branch extending from the second node toward the first node is deleted, the processing node changing means is turned off and then transition branch deleting means is turned on, the transition branch deleting means deletes all of oriented branches which are redundant to determine the order relationship among the nodes and having said required-node connection path searching means, said required node changing means, said processing node changing means and said transition branch deleting means, said cluster searching means is arranged such that a set of all of supply nodes having the "required node flag" which has been turned on is made to be a required supply node set, one arbitrary node is selected from the required supply node set, cluster producing means is turned on for the selected node by using the node as a factor, said cluster producing means searches, when a supply node or a joining node to which only one oriented branch output from the supply node is input and a set of nodes on the path in which the joining nodes are alternately connected by oriented branches or a set of nodes composed of one supply node is made to be a cluster, for a cluster having the maximum number of elements including the supply node instructed as the factor, and arranged to change the connection with the oriented branches among the nodes which are elements of the cluster in such a manner that input of an oriented branch output from individual nodes to a node in the cluster except for the joining node is inhibited and a tree structure is formed such that the parts output from the supply node in the cluster are concentrated to one node which is the apex and apex changing means for changing the node from which the oriented branch is input to the node on the outside of the cluster of all of oriented branches output from the node of the searched cluster to the node which is the apex of the tree structure of the searched cluster, and said process expression tree producing means is arranged such that all of supply nodes included in the searched cluster and having the "required node flag" which has been turned on are deleted from the required supply node set, the overall body of the searched cluster is made to be a supply node having the "required node flag" which has been turned on, the thus-made new node is added to the required supply node set, if the number of elements of the required supply node set is resulted to be two or more, one arbitrary node is selected from the required supply node, required node absorbing means is turned on for the selected node by using the node as a factor or final node absorbing means is turned on by using the node at the apex of the tree structure of the cluster which is a sole node of the required supply node as a factor, said required node absorbing means ends the process of the required node absorbing means if the node to which the oriented branch output from the node instructed as the factor includes one or more joining node having the "required node flag" which has been turned on, or searches one node from the node to which the oriented branch output from the node instructed as the factor in accordance with the given priority order, if a node satisfying the condition instructed with the priority order is not detected, the process of the required node absorbing means ends, or the searched node is the node at a new apex of the tree structure of the cluster, the node from which the oriented branch output from the node in the cluster is changed to the node which is the apex of the tree structure of the cluster, the transition branch deleting means is turned on, when the process of the required node absorbing means ends, one arbitrary node is again selected from the required supply node set, the cluster producing means is turned on by using the selected node as a factor, said required node absorbing means, said cluster producing means and said transition branch deleting means are sequentially turned on until the number of elements in the required supply node set is made to be one, when the number of elements has been made to be one, addition node absorbing means is turned on, said addition node absorbing means searches one node from the nodes to which the oriented branch output from the node instructed as the factor in accordance with a given priority order, if the node satisfying the condition instructed with the priority order is not detected, the process of said addition node absorbing means ends or the searched node is the node of a new apex of the tree structure of the cluster, the node from which the oriented branch of from the node in the cluster is output to a node which is the apex of the tree structure of the cluster, the transition branch deleting means is turned on, and then the final node absorbing means is turned, said final node absorbing means produces an oriented branch from the node at the apex of the tree structure of the sole cluster to the node corresponding to the end process and having the foregoing process, said cluster producing means, said transition branch deleting means, said required node absorbing means, said addition node absorbing means and said final node absorbing means.

4. The Article manufacturing procedure determining system of claim 1, wherein the process expressing tree is produced by deconstructing the dependency graph to change the oriented branch to cause one oriented branch to be output from each node and cause a single oriented branch to be input to the processing node while preventing change in an execution order relationship among the nodes.

5. Data unifying procedure determining system comprising:

node connection means for producing an initial graph, initially-required node selection means for selecting required nodes, initial graph producing means for producing an initial graph corresponding to each element process and composed of nodes and oriented branches, dependency graph producing means for deconstructing the initial graph to produce a dependency graph by producing the oriented branch for a processing node from a joining node required to form all parts input to the processing node into one set before a process in the processing node is performed and by deleting the oriented branches that are unnecessary for expressing an execution order relationship among nodes and process expression tree producing means deconstructs the dependency graph to produce a process expression tree for expressing a data unifying procedure which can be executed.

6. The data unifying procedure determining system of claim 5, wherein said node connection means, when a plurality of element processes including one end process and at least one or more supply processes are given which are classified into any one of a supply process for acquiring data from an information source and outputting acquired data as data in a table format when a list corresponding to one set of data arranged such that each row corresponds to data of one type and each column relates to the same entity is formed into a table, a joining process for comparing data positioned on each row of two or more tables supplied as an input and corresponding to an instructed column in each table to make a set of rows satisfying instructed conditions to be a new row of a table so as to produce and output a new table or deleting a row from one table supplied as an input in accordance with an instructed conditions, a processing process for adding one or more new columns to a table supplied as an input, converting data on an existing column for each row to produce new data to store new data in a new column to output the thus-expanded table and an end process for producing a final result on the basis of the table supplied as an input and in a case where one node is made to correspond to each element process and a part output from a certain element process is input to another element process, produces a oriented branch for each of the nodes except for a node corresponding to the end process from a node corresponding to the element process for outputting the part to a node corresponding to an element process to which the part is input so as to produce an initial graph composed of nodes and oriented branches, said initially-required-node selection means outputs a necessary part which is necessary in the end process and selecting a node corresponding to the supply process or the processing process as an initially-required node, said initial graph producing means produces an initial graph by turning said initially-required-node selection means and said node connection means on, said dependency graph producing means deconstructs said initial graph to produce a dependency graph for expressing the execution order relationship among nodes with oriented branches to cause all of parts which are input to all of processing nodes to be formed into one set with joining nodes before a process with the processing node is performed, and said process expressing tree producing means deconstructs the made dependency graph to resolve a contradiction that an output from a single node is made to be inputs for plural nodes to produce a process expression tree expressing a data unifying procedure which can be performed.

7. The data unifying procedure determining system of claim 6, wherein when all nodes of the process expression tree at which arrival can be made by, in the forward direction, moving the oriented branch from the node on the connection path for connecting the initially-required nodes to each other and all nodes at which arrival can be made by, in an inverted direction, moving the oriented branch from the node on the connection path for connecting the initially-required nodes to each other are made to be required nodes, tables output from the required nodes are made to be required tables and tables output from nodes except for the required nodes to additional tables, outer join of joining nodes to each of which one required table and one additional table are input is performed, and inner join of joining nodes to each of which two required tables are input is performed.

8. The data unifying order determining system of claim 5, wherein said node connection means, when a plurality of element processes including one end process and at least one or more supply processes are given which are classified into any one of a supply process for acquiring data from an information source and outputting acquired data as data in a table format when a list corresponding to one set of data arranged such that each row corresponds to data of one type and each column relates to the same entity is formed into a table, a joining process for comparing data positioned on each row of two or more tables supplied as an input and corresponding to an instructed column in each table to make a set of rows satisfying instructed conditions to be a new row of a table so as to produce and output a new table or deleting a row from one table supplied as an input in accordance with an instructed condition, a processing process for adding one or more new columns to a table supplied as an input, converting data on an existing column for each row to produce new data to store new data in a new column to output the thus-expanded table and an end process for producing a final result on the basis of the table supplied as an input and in a case where one node is made to correspond to each element process and a part output from a certain element process is input to another element process, produces an oriented branch for each of the nodes except for a node corresponding to the end process from a node corresponding to the element process for outputting the part to a node corresponding to an element process to which the part is input so as to produce an initial graph composed of nodes and oriented branches, said initially-required-node selection means outputs a necessary part which is necessary in the end process and selecting a node corresponding to the supply process or the processing process as an initially-required node, said initial graph producing means turns said initially-required node selection means and said node connection means on, dependency graph producing means structured such that connection pass searching means including all of required nodes and arranged to connect the required nodes through directed edges and other nodes and to search a connection path having no loop is turned on, then respective nodes on the connection paths searched by the required node connection path searching means are sequentially selected, required node changing means is turned on for each of the selected node by using the node as a factor, said required node changing means makes the node supplied as the factor to be a first node, turns on a "required node flag" indicating that the first node is necessary, if the first node is a node except for a processing node, then said required node changing means is turned on by using each node for outputting an oriented branch toward the first node as a factor, if the first node is a processing node, a connection path for connecting respective nodes for outputting the directed edges to the first node is obtained and said required node changing means is turned on by using all of nodes on the connection path as factors to produce an oriented branch extending from each joining node on the connection path to the first node and delete the oriented branch oriented from each supply node on the connection path toward the first node, when the process of said required node changing means has been completed, then processing node changing means is turned on for each processing node except for the required node by using the node as a factor, said processing node changing means makes the node supplied as the factor to be a first node, if a "process completion flag" of the first node is turned on, the process ends, if the same is not turned on, and if the first node is a supply node or a joining node, the required node changing means are sequentially turned on by using each node for outputting the oriented branch toward the first node as a factor, if the first node is a processing node, connection paths for connecting all nodes for outputting directed edges toward the first node are searched to sequentially select each of the searched node one by one, the selected node is made to be a second node, said processing node changing means is turned on for the second node, if the second node is a joining node, an oriented branch extending from the second node to the first node is made, if the second node is a supply node, the oriented branch extending from the second node toward the first node is deleted, the processing node changing means is turned off and then transition branch deleting means is turned on, the transition branch deleting means deletes all of directed edges which are redundant to determine the order relationship among the nodes and having said required-node connection path searching means, said required node changing means, said processing node changing means and said transition branch deleting means, said cluster searching means is arranged such that a set of all of supply nodes having the "required node flag" which has been turned on is made to be a required supply node set, one arbitrary node is selected from the required supply node set, cluster producing means is turned on for the selected node by using the node as a factor, said cluster producing means searches, when a supply node or a joining node to which only one oriented branch output from the supply node is input and a set of nodes on the path in which the joining nodes are alternately connected by directed edges or a set of nodes composed of one supply node is made to be a cluster, for a cluster having the maximum number of elements including the supply node instructed as the factor, and is arranged to change the connection with the directed edges among the nodes which are elements of the cluster in such a manner that input of an oriented branch output from individual nodes to a node in the cluster except for the joining node is inhibited and a tree structure is formed such that the parts output from the supply node in the cluster are concentrated to one node which is the apex and apex changing means for changing the node from which the oriented branch is input to the node on the outside of the cluster of all of directed edges output from the node of the searched cluster to the node which is the apex of the tree structure of the searched cluster, and said process expression tree producing means is arranged such that all of supply nodes included in the searched cluster and having the "required node flag" which has been turned on are deleted from the required supply node set, the overall body of the searched cluster is made to be a supply node having the "required node flag" which has been turned on, the thus-made new node is added to the required supply node set, if the number of elements of the required supply node set is resulted to be two or more, one arbitrary node is selected from the required supply node, required node absorbing means is turned on for the selected node by using the node as a factor or final node absorbing means is turned on by using the node at the apex of the tree structure of the cluster which is a sole node of the required supply node as a factor, said required node absorbing means ends the process of the required node absorbing means if the node to which the oriented branch output from the node instructed as the factor includes one or more joining node having the "required node flag" which has been turned on, or searches one node from the node to which the oriented branch output from the node instructed as the factor in accordance with the given priority order, if a node satisfying the condition instructed with the priority order is not detected, the process of the required node absorbing means ends, or the searched node is the node at a new apex of the tree structure of the cluster, the node from which the oriented branch output from the node in the cluster is changed to the node which is the apex of the tree structure of the cluster, the transition branch deleting means is turned on, when the process of the required node absorbing means ends, one arbitrary node is again selected from the required supply node set, the cluster producing means is turned on by using the selected node as a factor, said required node absorbing means, said cluster producing means and said transition branch deleting means are sequentially turned on until the number of elements in the required supply node set is made to be one, when the number of elements has been made to be one, addition node absorbing means is turned on, said addition node absorbing means searches one node from the nodes to which the oriented branch output from the node instructed as the factor in accordance with a given priority order, if the node satisfying the condition instructed with the priority order is not detected, the process of said addition node absorbing means ends or the searched node is the node of a new apex of the tree structure of the cluster, the node from which the oriented branch output from the cluster is changed to a node which is the apex of the tree structure of the cluster, the transition branch deleting means is turned on, and then the final node absorbing means is turned, said final node absorbing means produces an oriented branch from the node at the apex of the tree structure of the sole cluster to the node corresponding to the end process and having the foregoing process, said cluster producing means, said transition branch deleting means, said required node absorbing means, said addition node absorbing means and said final node absorbing means.

9. The data unifying procedure determining system of claim 8, wherein when additional information is required in addition to required information, all of the procedures are executed, when only required information is required, no process is performed by said processing node changing means and said addition node absorbing means, said final node absorbing means produces an oriented branch from the node at the apex of the tree structure of the sole cluster toward the node corresponding to the end process, and deletes the directed edges extending from the node at the apex of the tree structure of the sole cluster to nodes except for the node corresponding to the end process.

10. The data unifying procedure determining system of claim 8, wherein when all nodes of the process expression tree at which arrival can be made by, in the forward direction, moving the oriented branch from the node on the connection path for connecting the initially-required nodes to each other and all nodes at which arrival can be made by, in an inverted direction, moving the oriented branch from the node on the connection path for connecting the initially-required nodes to each other are made to be required nodes, tables output from the required nodes are made to be required tables and tables output from nodes except for the required nodes are made to be additional tables, outer join of joining nodes to each of which one required table and one additional table are input is performed, and inner join of joining nodes to each of which two required tables are input is performed.

11. The data unifying procedure determining system of claim 8, wherein said initially-required selection means makes a supply node for outputting a table including a column having a retrieval condition to be an initially-required node, and when all nodes of the process expression tree at which arrival can be made by, in the forward direction, moving the oriented branch from the node on the connection path for connecting the initially-required nodes to each other and all nodes at which arrival can be made by, in an inverted direction, moving the oriented branch from the node on the connection path for connecting the initially-required nodes to each other are made to be required nodes, tables output from the required nodes are made to be required tables and tables output from nodes except for the required nodes are made to be additional tables, outer join of joining nodes to each of which one required table and one additional table are input is performed, full outer join of joining nodes, to each of which two required tables are input and which have only comparative columns for joining have retrieval conditions, and inner join of joining nodes except for the above-mentioned nodes to each of which two required tables are input is performed.

12. The data unifying procedure determining system of claim 8, wherein when said required node absorbing means searches one node from all nodes to which directed edges output from nodes instructed as factors are input in accordance with a given priority order, a first priority is given to a joining node which has the "required node flag" which has not been turned on and to which one oriented branch is input, and a second priority order is given to a processing node including a joining node among nodes to which arrival can be made by, in the forward direction, moving the oriented branch.

13. The data unifying procedure determining system of claim 8, wherein when said additional node absorbing means searches one node from all nodes to which directed edges output from an instructed node as a factor is input in accordance with a given priority order, a first priority order is given to a joining node to which one oriented branch is input, and a second priority order is given to other nodes.

14. The data unifying procedure determining system of claim 5, wherein the process expressing tree is produced by deconstructing the dependency graph to change the oriented branch to cause one oriented branch to be output from each node and cause a single oriented branch to be input to the processing node while preventing change in an execution order relationship among the nodes.

* * * * *

UNITED STATES PATENT AND TRADEMARK OFFICE
CERTIFICATE OF CORRECTION

PATENT NO. : 5,988,854

DATED : November 23, 1999

INVENTOR(S) : MUNAKATA, KOICHI

It is certified that error appears in the above-identified patent and that said Letters Patent is hereby corrected as shown below:

Column 29, lines 32-33 and Column 33, lines 22-23, delete "among nodes and process expression tree producing means deconstructs the" and insert --among nodes; and process expression tree producing means for deconstructing the--.

Signed and Sealed this

Twenty-seventh Day of March, 2001

*Attest:*

NICHOLAS P. GODICI

*Attesting Officer*  *Acting Director of the United States Patent and Trademark Office*